(12) United States Patent
Foti

(10) Patent No.: US 11,323,318 B2
(45) Date of Patent: May 3, 2022

(54) NETWORK SLICING IN IMS

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/965,712

(22) PCT Filed: Jan. 28, 2019

(86) PCT No.: PCT/IB2019/050682
§ 371 (c)(1),
(2) Date: Jul. 29, 2020

(87) PCT Pub. No.: WO2019/150245
PCT Pub. Date: Aug. 8, 2019

(65) Prior Publication Data
US 2021/0036919 A1 Feb. 4, 2021

Related U.S. Application Data

(60) Provisional application No. 62/625,432, filed on Feb. 2, 2018.

(51) Int. Cl.
*H04L 65/1016* (2022.01)
*H04L 41/0806* (2022.01)
(Continued)

(52) U.S. Cl.
CPC ...... *H04L 41/0806* (2013.01); *H04L 65/1006* (2013.01); *H04L 65/1016* (2013.01); *H04L 65/1069* (2013.01); *H04W 60/00* (2013.01)

(58) Field of Classification Search
CPC ............ H04L 41/0806; H04L 65/1006; H04L 65/1016; H04L 65/1069; H04L 65/1073; H04L 65/1063; H04L 63/08
See application file for complete search history.

(56) References Cited

U.S. PATENT DOCUMENTS

2007/0008913 A1 1/2007 Naqvi et al.
2009/0093249 A1* 4/2009 Zhu .................. H04L 65/1073
455/433
(Continued)

FOREIGN PATENT DOCUMENTS

WO 2019120076 A1 6/2019
WO 2020084392 A1 4/2020

OTHER PUBLICATIONS

Author Unknown, "Technical Specification Group Services and System Aspects; Study on Enhanced IMS to 5GC Integration (Release 16)," Technical Report 23.794, Version 1.0.0, Mar. 2019, 3GPP Organizational Partners, 83 pages.
(Continued)

*Primary Examiner* — Glenford J Madamba
(74) *Attorney, Agent, or Firm* — Withrow & Terranova, PLLC

(57) ABSTRACT

Systems and methods are disclosed for enabling Internet Protocol (IP) Multimedia Subsystem (IMS) network slicing. In some embodiments a method performed by a wireless device relating to registering with an IMS network slice or initiating a session using an IMS network slice comprises sending a message to an IMS node via a radio access network, the message comprising an identifier of a desired IMS network slice. In this manner, IMS network slicing is enabled.

13 Claims, 12 Drawing Sheets

(51) Int. Cl.
*H04L 65/10* (2022.01)
*H04L 65/1069* (2022.01)
*H04W 60/00* (2009.01)

(56) References Cited

U.S. PATENT DOCUMENTS

| | | |
|---|---|---|
| 2010/0150137 A1 | 6/2010 | Lu et al. |
| 2010/0217875 A1 | 8/2010 | Vergara et al. |
| 2015/0195864 A1* | 7/2015 | Bartolome Rodrigo .................... H04L 65/1073 370/221 |
| 2018/0007612 A1* | 1/2018 | Jahangir ............... H04W 8/005 |
| 2019/0021043 A1* | 1/2019 | Youn ................. H04W 36/0055 |
| 2019/0223093 A1* | 7/2019 | Watfa .................... H04W 36/06 |
| 2020/0137675 A1* | 4/2020 | Park ...................... H04W 60/00 |

OTHER PUBLICATIONS

Author Unknown, "Technical Specification Group Core Network and Terminals; Study on IMS Restoration Procedures (Release 9)," Technical Report 23.820, Version 9.0.0, Sep. 2009, 3GPP Organizational Partners, 43 pages.

China Mobile, "S5-197283: Add attribute properties for network slice supports IMS and SSC mode," Third Generation Partnership Project (3GPP), TSG-SA5 Meeting #128, Nov. 18-22, 2019, Zhuhai, China, 6 pages.

Invitation to Pay Fees and Partial Search for International Patent Application No. PCT/IB2020/058054, dated Nov. 20, 2020, 22 pages.

International Search Report and Written Opinion for International Patent Application No. PCT/IB2020/058054, dated Jan. 18, 2021, 26 pages.

Author Unknown, "Technical Specification Group Core Network and Terminals; IP Multimedia (IM) session handling; IM call model; Stage 2 (Release 15)," Technical Specification 23.218, Version 15.0.0, 3GPP Organizational Partners, Jun. 2018, 73 pages.

Author Unknown, "Technical Specification Group Services and System Aspects; IP Multimedia Subsystem (IMS); Stage 2 (Release 15)," Technical Specification 23.228, Version 15.1.0, 3GPP Organizational Partners, Dec. 2017, 329 pages.

Author Unknown, "Technical Specification Group Services and System Aspects; System Architecture for the 5G System; Stage 2 (Release 15)," Technical Specification 23.501, Version 15.0.0, 3GPP Organizational Partners, Dec. 2017, 181 pages.

Author Unknown, "Technical Specification Group Services and System Aspects; Procedures for the 5G System; Stage 2 (Release 15)," Technical Specification 23.502, Version 15.0.0, 3GPP Organizational Partners, Dec. 2017, 258 pages.

Author Unknown, "Technical Specification Group Core Network and Terminals; IP Multimedia call control protocol based on Session Initiation Protocol (SIP) and Session Description Protocol (SDP); Stage 3 (Release 15)," Technical Specification 24.229, Version 15.1.0, 3GPP Organizational Partners, Dec. 2017, 999 pages.

China Mobile, "S1-174518: FS_enIMS TR22.823: Use case on network slicing of IMS independent to 5GC slice," Third Generation Partnership Project (3GPP), TSG-SA WG1 Meeting #80, Nov. 27-Dec. 1, 2017, 3 pages, Reno, NV.

China Mobile, "S2-180714: key issue of P-CSCF discovery for UE accessing to multiple IMS network via a network slice," Third Generation Partnership Project (3GPP), SA WG2 Meeting #125, Jan. 22-26, 2018, 1 page, Gothenburg, Sweden.

Huawei, et al., "S2-182176: Solution for Network Slicing and IMS Scenario 2," Third Generation Partnership Project (3GPP), SA WG2 Meeting #126, Feb. 26-Mar. 2, 2018, 4 pages, Montreal, Canada.

T-Mobile USA Inc, "S2-172029: Network Slicing and IMS Interactions," Third Generation Partnership Project (3GPP), SA WG2 Meeting #120, Mar. 27-31, 2017, 3 pages, Busan, South Korea.

International Search Report and Written Opinion for International Patent Application No. PCT/IB2019/050682, dated Apr. 12, 2019, 16 pages.

International Search Report and Written Opinion for International Patent Application No. PCT/IB2019/058785, dated Jan. 3, 2020, 17 pages.

* cited by examiner

NETWORK SLICING IN IMS

RELATED APPLICATIONS

This application is a 35 U.S.C. § 371 national phase filing of International Application No. PCT/IB2019/050682, filed Jan. 28, 2019, which claims the benefit of provisional patent application Ser. No. 62/625,432, filed Feb. 2, 2018, the disclosures of which are hereby incorporated herein by reference in their entireties.

TECHNICAL FIELD

The present disclosure relates to network slicing and, in particular, to network slicing in an Internet Protocol (IP) Multimedia Subsystem (IMS).

BACKGROUND

Network slicing utilizes virtualization technology (e.g., Software Defined Networking (SDN) and Network Functions Virtualization (NFV)) to allow multiple virtual (i.e., logical) networks to be created on top of a common shared physical infrastructure. These virtual networks are referred to as network slices. The network slices can then be customized to meet needs of different use cases.

For example, in Third Generation Partnership Project (3GPP), network slicing has been proposed for the Fifth Generation (5G) System (5GS). In this regard, FIG. 1 illustrates an example of a 5GS including a 5G Radio Access Network (RAN), a 5G Core Network (5GC), and an Internet Protocol (IP) Multimedia Subsystem (IMS). Together, the 5G RAN and the 5GC are referred to as a 5GS. As illustrated, the 5G RAN includes a number of radio access nodes (referred to as New Radio (NR) base stations (gNBs)). The 5GC includes a number of core network nodes, or core network functions, such as, e.g., an Authentication Management Function(s) (AMF(s)), a User Plane Function(s) (UPF(s)), a Policy Control Function(s) (PCF(s)), etc. The IMS includes a number of IMS nodes such as, e.g., a Serving Call Session Control Function(s) (S-CSCF(s)), a Proxy Call Session Control Function(s) (P-CSCF(s)), a Home Subscriber Service(s) (HSS(s)), etc. FIG. 2 illustrates the concept of network slicing with respect to the 5GS. As shown in FIG. 2, the 5GS supports multiple services. In this example, there are four services labelled as Service 1, Service 2, Service 3, and Service 4. Example services include, but are not limited to, enhanced Mobile Broadband (eMBB), Ultra Reliable Low Latency Communication (URLLC), massive Machine Type Communication (mMTC) or massive Internet of Things (IoT), emergency services, and/or the like. As shown, each of the services is mapped to a 5GS network slice that is customized to meet the needs of that service. Note that more than one service may be mapped to the same 5GS network slice. As also illustrated in FIG. 2, the 5GS network slices are implemented on the same physical infrastructure.

There currently exist certain challenge(s). In particular, support for network slicing in the IMS is currently being studied in 3GPP. However, at this point, the IMS does not support network slicing. As such, there is a need for systems and methods for supporting network slicing in the IMS.

SUMMARY

Systems and methods are disclosed for enabling Internet Protocol (IP) Multimedia Subsystem (IMS) network slicing. In some embodiments a method performed by a wireless device relating to registering with an IMS network slice or initiating a session using an IMS network slice comprises sending a message to an IMS node via a radio access network, the message comprising an identifier of a desired IMS network slice. In this manner, IMS network slicing is enabled.

In some embodiments, the message is a first registration message for registration of the wireless device with the desired IMS network slice. Further, in some embodiments, the message comprises an IP Multimedia Private Identity (IMPI) of the wireless device. Further, in some embodiments, the message further comprises an IP Multimedia Public Identity (IMPU) of the wireless device. In some other embodiments, the message further comprises information that indicates a plurality of IMPUs of the wireless device.

In some embodiments, the method further comprises sending a second registration message to an IMS node via the Radio Access Network (RAN), the second registration message comprising an identifier of a second desired IMS network slice. Further, in some embodiments, the first registration message and the second registration message are for a same IMPI-IMPU pair of the wireless device. Further, in some embodiments, separate registration contexts are created and stored in the IMS for the registration of the IMPI-IMPU pair with the desired IMS network slice and the second desired IMS network slice. In some other embodiments, the first registration message and the second registration message are for a same IMPI of the wireless device but different IMPUs of the wireless device. Further, in some embodiments, separate registration contexts are created and stored in the IMS for the registration of the wireless device with the desired IMS network slice and the second desired IMS network slice. In some other embodiments, the first registration message and the second registration message are for different IMPIs of the wireless device and different IMPUs of the wireless device. In some embodiments, the method further comprises maintaining separate registrations for the wireless device for each of the desired IMS network slices.

In some embodiments, the method further comprises receiving a response from the IMS node comprising a list of identifiers of IMS network slices to which the wireless device is subscribed.

In some embodiments, the message is a Session Initiation Protocol (SIP) INVITE.

In some embodiments, sending the message comprises sending the message to a Proxy Call Session Control Function (P-CSCF), and the method further comprises selecting the P-CSCF from two or more P-CSCFs.

In some embodiments, sending the message comprises sending the message to a selected P-CSCF, and the method further comprises selecting the P-CSCF from two or more P-CSCFs based on the identifier of the desired IMS network slice. Further, in some embodiments, selecting the P-CSCF from the two or more P-CSCFs based on the identifier of the desired IMS network slice comprises obtaining two or more Fully Qualified Domain Names (FQDNs) or two or more IP addresses for the two or more P-CSCFs, respectively; obtaining information that indicates one or more supported IMS network slices for each P-CSCF of the two or more P-CSCFs; and selecting, based on the information that indicates one or more supported IMS network slices for each P-CSCF of the two or more P-CSCFs, one of the two or more P-CSCFs that supports the desired IMS network slice as the selected P-CSCF to which to send the message. In some other embodiments, selecting the P-CSCF from the two or more P-CSCFs based on the identifier of the desired IMS network slice comprises obtaining FQDNs for the two or more P-CSCFs for each supported IMS network slice, wherein each of the FQDNs includes a network slice identifier part that identifies a corresponding IMS network slice, and selecting, based on a comparison of the identifier of the desired IMS network slice and the network slice identifier part of the FQDNs, one of the FQDNs as a FQDN for sending the message.

In some embodiments, the identifier of the IMS network slice is mapped to one or more Fifth Generation System (5GS) network slices.

Embodiments of a wireless device for registering with an IMS network slice or initiating a session using an IMS network slice are also disclosed. In some embodiments, a wireless device for registering with an IMS network slice or initiating a session using an IMS network slice is adapted to send a message to an IMS node via a RAN, the message comprising an identifier of a desired IMS network slice.

In some other embodiments, a wireless device for registering with an IMS network slice or initiating a session using an IMS network slice comprises one or more transmitters and one or more receivers operable to provide wireless transmission and reception using a RAN, one or more processors, and memory comprising instructions executable by the one or more processors whereby the wireless device is operable to send a message to an IMS node via a RAN, the message comprising an identifier of a desired IMS network slice.

Embodiments of a method performed by an IMS node relating to registering a wireless device with an IMS network slice or initiating a session for the wireless device using an IMS network slice are also disclosed. In some embodiments, a method performed by an IMS node relating to registering a wireless device with an IMS network slice or initiating a session for the wireless device using an IMS network slice comprises receiving a message comprising an identifier of a desired IMS network slice, the desired IMS network slice being an IMS network slice with which a wireless device desires to register or an IMS network slice on which a wireless device is initiating a session and performing one or more actions upon receiving the message comprising the identifier of the desired IMS network slice.

In some embodiments, the IMS node is a P-CSCF, and the message is a first registration message for registration of the wireless device with the desired IMS network slice such that receiving the message comprises receiving the message from the wireless device. Further, in some embodiments, the message comprises an IMPI of the wireless device. Further, in some embodiments, the message further comprises an IMPU of the wireless device. In some other embodiments, the message further comprises information that indicates a plurality of IMPUs of the wireless device.

In some embodiments, the method further comprises receiving a second registration message from the wireless device, the second registration message comprising an identifier of a second desired IMS network slice. In some embodiments, the first registration message and the second registration message are for a same IMPI-IMPU pair of the wireless device. Further, in some embodiments, separate registration contexts are created and stored in the IMS for the registration of the IMPI-IMPU pair with the desired IMS network slice and the second desired IMS network slice. In some other embodiments, the first registration message and the second registration message are for a same IMPI of the wireless device but different IMPUs of the wireless device. Further, in some embodiments, separate registration contexts are created and stored in the IMS for the registration of the wireless device with the desired IMS network slice and the second desired IMS network slice. In some other embodiments, the first registration message and the second registration message are for different IMPIs of the wireless device and different IMPUs of the wireless device. In some embodiments, the method further comprises maintaining separate registrations for the wireless device for each of the desired IMS network slices.

In some embodiments, the method further comprises sending a registration message comprising the identifier of the second desired IMS network slice to an Interrogating Call Session Control Function (I-CSCF). Further, in some embodiments, the method further comprises validating that the identifier of the second desired IMS network slice is supported by the P-CSCF prior to sending the registration message to the I-CSCF.

In some embodiments, performing the one or more actions comprises sending a registration message comprising the identifier of the desired IMS network slice to an I-CSCF. Further, in some embodiments, performing the one or more actions further comprises validating that the identifier of the desired IMS network slice is supported by the P-CSCF prior to sending the registration message to the I-CSCF.

In some other embodiments, the IMS node is a P-CSCF, and the message is a SIP INVITE. Further, in some embodiments, performing the one or more actions comprises verifying that the identifier of the desired IMS network slice is supported by the P-CSCF, and sending a SIP INVITE comprising the identifier of the desired IMS network slice to a Serving Call Session Control Function (S-CSCF) comprised in the desired IMS network slice.

In some other embodiments, the IMS node is an I-CSCF, the message is a first registration message for registration of the wireless device with the desired IMS network slice, and receiving the message comprises receiving the message from a P-CSCF. Further, in some embodiments, the message comprises an IMPI of the wireless device. Further, in some embodiments, the message further comprises an IMPU of the wireless device. In some other embodiments, the message further comprises information that indicates a plurality of IMPUs of the wireless device.

In some embodiments, the method further comprises receiving a second registration message for registration of the wireless device with a second desired IMS network slice, the second registration message comprising an identifier of a second desired IMS network slice. Further, in some embodiments, the first registration message and the second registration message are for a same IMPI-IMPU pair of the wireless device. Further, in some embodiments, separate registration contexts are created and stored in the IMS for the registration of the IMPI-IMPU pair with the desired IMS network slice and the second desired IMS network slice. In some other embodiments, the first registration message and the second registration message are for a same IMPI of the wireless device but different IMPUs of the wireless device. Further, in some embodiments, separate registration contexts are created and stored in the IMS for the registration of the wireless device with the desired IMS network slice and the second desired IMS network slice. In some other embodiments, the first registration message and the second registration message are for different IMPIs of the wireless device and different IMPUs of the wireless device.

In some embodiments, the method further comprises sending a query to a Home Subscriber Service (HSS), the query comprising the identifier of the second desired IMS network slice. Further, in some embodiments, the method further comprises receiving a response from the HSS, the response comprising a list of S-CSCFs and identifiers of IMS network slices supported by each S-CSCF in the list of S-CSCFs. Further, in some embodiments, the response further comprises an indication that the wireless device is already authenticated.

In some embodiments, the method further comprises selecting one of the S-CSCFs that supports the second desired IMS network slice as a selected S-CSCF for the second desired IMS network slice and sending a registration message to the selected S-CSCF for the second desired IMS network slice comprising the identifier of the second desired IMS network slice. Further, in some embodiments, the registration message sent to the selected S-CSCF for the second desired IMS network slice further comprises an indication that the wireless device is already authenticated.

In some embodiments, performing the one or more actions comprises, upon receiving the message from the P-CSCF, sending a query to a HSS and receiving a response from the HSS, the response comprising a list of S-CSCFs and identifiers of IMS network slices supported by each S-CSCF in the list of S-CSCFs. Further, in some embodiments, performing the one or more actions further comprises selecting one of the S-CSCFs that supports the desired IMS network slice as a selected S-CSCF for the desired IMS network slice and sending a registration message to the selected S-CSCF for the desired IMS network slice comprising the identifier of the desired IMS network slice.

In some other embodiments, the IMS node is an I-CSCF, and the message is a SIP INVITE.

In some other embodiments, the IMS node is an S-CSCF, the message is a registration message for registration of the wireless device with the desired IMS network slice, and receiving the message comprises receiving the message from an I-CSCF. Further, in some embodiments, the message comprises an IMPI of the wireless device. Further, in some embodiments, the message further comprises an IMPU of the wireless device. In some other embodiments, the message further comprises information that indicates a plurality of IMPUs of the wireless device.

In some embodiments, performing the one or more actions comprises communicating with a HSS to get authentication information regarding authentication of the wireless device with the desired IMS network slice.

In some embodiments, performing the one or more actions comprises communicating with a HSS to store information regarding registration of the wireless device with the desired IMS network slice, the information being for a particular IMPI-IMPU pair of the wireless device and the desired IMS network slice such that this information is separate from any information stored for different IMPI-IMPU pairs for the same or different IMS network slices and for the same IMPI-IMPU pair for different IMS network slices. Further, in some embodiments, the stored information for the desired IMS network slice is separate from information stored for the wireless device regarding one or more different IMS network slices with which the wireless device is registered. In some embodiments, performing the one or more actions further comprises validating that the identifier of the desired IMS network slice is supported by the S-CSCF prior to communicating with the HSS.

In some other embodiments, the IMS node is a HSS, and the message is a query received from an I-CSCF, the query comprising the identifier of the desired IMS network slice. In some embodiments, performing the one or more actions comprises sending a response to the I-CSCF, the response comprising an identifier of an S-CSCF previously selected and stored for the wireless device for the desired IMS network slice. In some other embodiments, performing the one or more actions comprises determining that the wireless device is already registered with an S-CSCF for a different IMS network slice and that re-authentication of the wireless device is not needed, and sending a response to the I-CSCF, the response comprising a list of S-CSCFs, identifiers of IMS network slices supported by each S-CSCF in the list of S-CSCFs, and an indication that the wireless device is already authenticated. In some embodiments, the HSS maintains separate registration contexts for the wireless device for each of two or more IMS network slices with which the wireless device is registered for each different IMPI-IMPU pair.

In some embodiments, a method performed by an IMS node relating to initiating a session for the wireless device using an IMS network slice comprises receiving a message comprising an identifier mapped to one or more network slice identifiers of one or more IMS network slices, respectively, wherein the one or more IMS network slices comprise a desired IMS network slice on which a wireless device is initiating a session. The method further comprises performing one or more actions upon receiving the message comprising the identifier. Further, in some embodiments, the identifier is mapped to two or more network slice identifiers of two or more IMS network slices, respectively.

In some embodiments, a method performed by a HSS relating to registering a wireless device with an IMS network slice comprises receiving, from an IMS node, a query comprising a flag related to IMS network slicing and sending, to the IMS node, a response comprising a list of S-CSCFs and one or more identifiers of one or more IMS network slices for each S-CSCF in the list of S-CSCFs.

In some embodiments, a method performed by a HSS relating to initiating a session for a wireless device using an IMS network slice comprises receiving, from an IMS node, a query comprising an identifier mapped to one or more network slice identifiers of one or more IMS network slices, respectively, wherein the one or more IMS network slices comprise a desired IMS network slice on which a wireless device is initiating a session. The method further comprises locating an S-CSCF with which the wireless device is registered that corresponds to the one or more IMS network slices and sending, to the IMS node, a response comprising an identifier of the S-CSCF.

Embodiments of an IMS node for registering a wireless device with an IMS network slice or initiating a session for the wireless device using an IMS network slice are also disclosed. In some embodiments, the IMS node is adapted to receive a message comprising an identifier of a desired IMS network slice, the desired IMS network slice being an IMS network slice with which a wireless device desires to register or an IMS network slice on which a wireless device is initiating a session.

In some embodiments, an IMS node for registering a wireless device with an IMS network slice or initiating a session for the wireless device using an IMS network slice comprises one or more network interfaces, one or more processors, and memory comprising instructions executable by the one or more processors whereby the IMS physical infrastructure node is operable to host a virtual IMS node operable to receive a message comprising an identifier of a desired IMS network slice, the desired IMS network slice being an IMS network slice with which a wireless device desires to register or an IMS network slice on which a wireless device is initiating a session.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network), a high-power or macro base station, a low-power base station (e.g., a micro base station, a pico base station, a home enhanced or evolved Node B (eNB), or the like), and a relay node.

Core Network Node: As used herein, a "core network node" is any type of node in a core network (e.g., a 5G Core Network (5GC)).

Internet Protocol (IP) Multimedia System (IMS) Node: As used herein, an "IMS node" is any type of node in an IMS. The IMS node may be a virtualized node in an IMS network slice.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
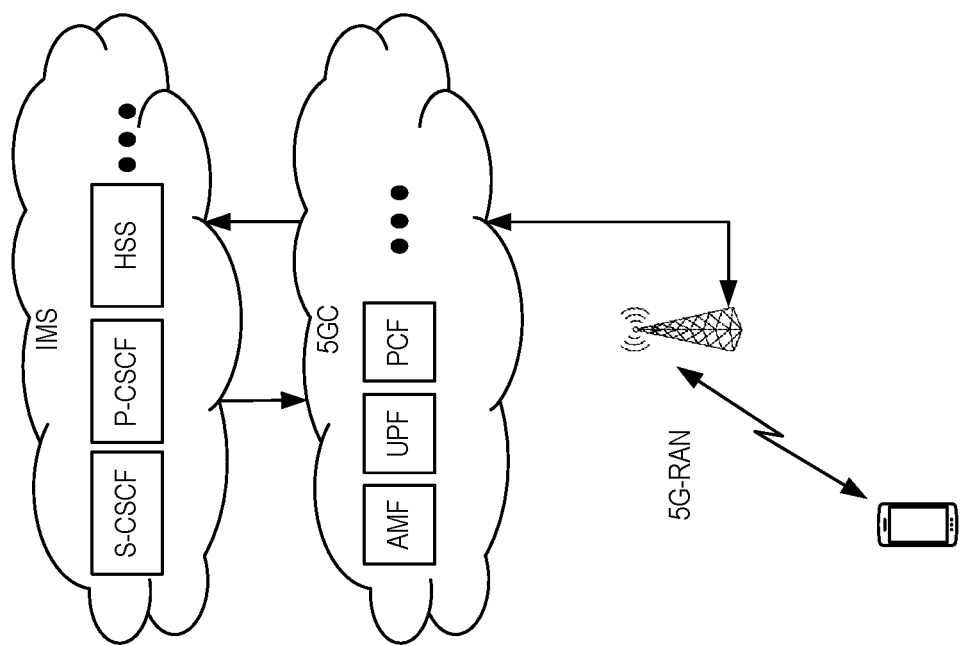
FIG. 1 illustrates an example of a Fifth Generation System (5GS) including a Fifth Generation (5G) Radio Access Network (RAN), a 5G Core Network (5GC), and an Internet Protocol (IP) Multimedia Subsystem (IMS)
Figure 2:
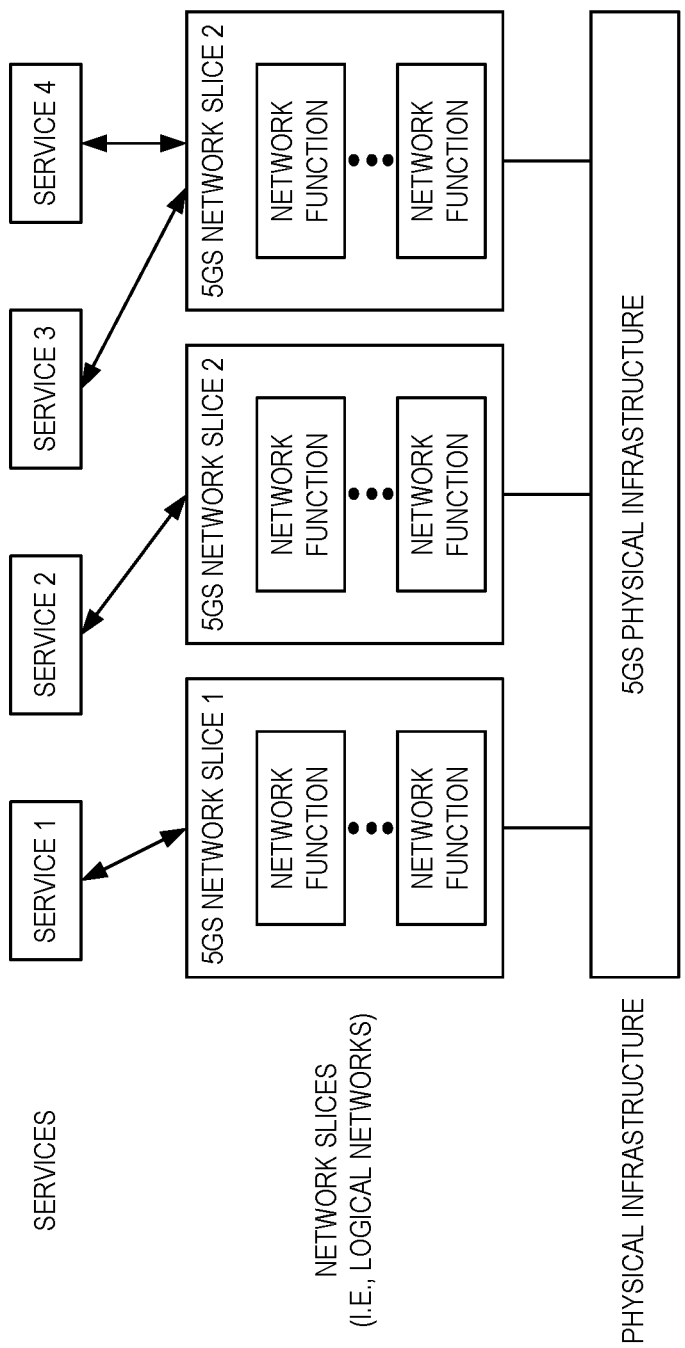
FIG. 2 illustrates the concept of network slicing with respect to the 5GS.
Figure 3:
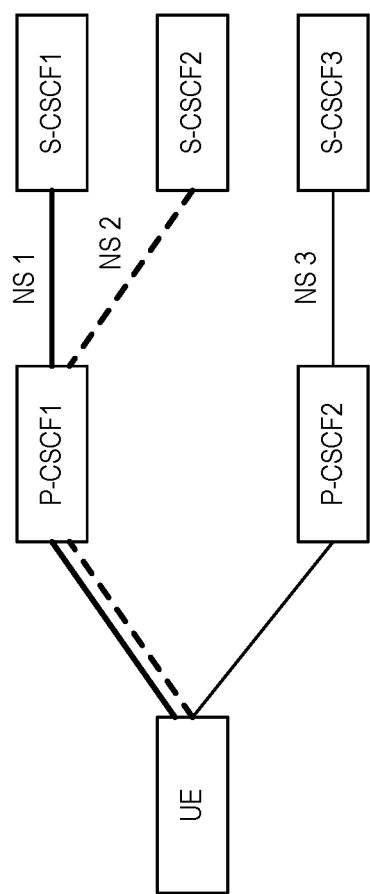
FIG. 3 illustrates one example of network slicing in an IMS network in accordance with some embodiments of the present disclosure.

FIG. 3 illustrates one example of network slicing in an IMS network. In this example, a User Equipment (UE) registers with three IMS network slices for different services. Each IMS network slice has a separate S-CSCF. As such, in this example, there are three separate S-CSCFs, one for each service. In this example, two separate network slice are used for these IMS network services. For example, Voice over Long Term Evolution (VoLTE) is one service that may use one network slice, while messaging is another service that may use a second network slice. Note, however, that two or more different services may use the same IMS network slice.

Currently, the IMS allows one Serving Call Session Control Function (S-CSCF) per UE. With network slicing in the IMS, this has to change such that one UE may register with and use multiple IMS network slices, each having a separate S-CSCF. In this regard, a particular UE typically has a single IP Multimedia Private Identity (IMPI) and one or more IP Multimedia Public Identities (IMPUs). However, by using, e.g., multiple virtual clients, a particular UE may include two or more IMPIs and two or more IMPUs. In accordance with embodiments of the present disclosure, in order to enable IMS network slicing, a particular IMPI-IMPU pair for a UE may be allocated multiple S-CSCFs depending on the requested IMS network slices.

Different Proxy Call Session Control Functions (P-CSCFs) may also be used for different IMS network slices. For instance, each IMS network slice may have a separate P-CSCF or, as illustrated in the example of FIG. 3, each P-CSCF may serve one or more IMS network slices. This means that the UE needs to locate the correct P-CSCF for the IMS network slice that meets its needs for a particular service. Hence, existing discovery schemes must evolve to enable the UE to find the correct P-CSCF matching the IMS network slice for the service that the UE desires.

For each IMS network slice, the UE may have multiple IMS sessions. Each requested IMS network slice will have a different identifier. Some network slices will be standardized to be usable across multiple operators, but some can be proprietary.

Certain aspects of the present disclosure and their embodiments may provide solutions to the aforementioned or other challenges. Against this backdrop where the IMS is understood to include multiple S-CSCFs for multiple IMS network slices, respectively, and may also include multiple P-CSCFs each associated with one or more of the network slices, the present disclosure describes various aspects that enable IMS network slicing:

- A UE indicates a first IMS network slice at IMS registration. This indication is provided by including a Network Slice Identifier (NS-ID) in, e.g., the IMS registration message and any subsequent IMS registration message(s).
- After registration with the first IMS network slice, if the UE desires to register with a second IMS network slice, the UE initiates a new IMS registration with a new NS-ID (i.e., the NS-ID of the second IMS network slice). The same or a different P-CSCF may be used in this case depending on the particular implementation. Note that the Home Subscriber Service (HSS) supports a different IMS registration context per IMPI-IMPU pair for each IMS network slice. During IMS registration for the second IMS network slice, if the same credentials are being reused, the HSS may choose to challenge the UE for the new IMS registration for the new NS-ID or the HSS may consider the UE properly authenticated based on the first IMS registration associated with the first NS-ID. Mapping this to FIG. 3, in that example, the HSS will hold three separate IMS registration contexts for the UE, where these three separate IMS registrations are independent. Assuming that the same IMPI-IMPU pair is used for the UE for all three IMS registrations, these three separate IMS registration contexts are for the same IMPI-IMPU pair.
- Note that the UE may use the same IMPI-IMPU pair for all of the network slices or may use different IMPI-IMPU pairs for some if not all of the network slices. A separate IMS registration context is stored by the HSS for the UE for each of the IMS network slices for which the UE is registered, where the IMS registration contexts are associated with the respective IMPI-IMPU pair used for IMS registration for the respective IMS network slice.
- At IMS registration, the HSS will allocate an S-CSCF that supports the IMS network slice requested by the UE and will store the allocated S-CSCF in the corresponding IMS registration context for the UE (i.e., for the IMPI-IMPU pair used by the UE for IMS registration for that IMS network slice). It is possible that the same S-CSCF supports two or more network slices. In this case, the S-CSCF will hold separate state information per network slice for the same IMPI-IMPU pair including its registration and related subscriber information. This ensures complete independence.
- The UE can deregister from any network slice, in which case all used resources in the CSCFs (i.e., both P-CSCF and S-CSCF) for that network slice for the respective IMPI-IMPU pair are released and the registration context corresponding to that network slice will be removed.
- Some IMS network slices will be standardized to be usable across multiple operators, but some IMS network slices can be proprietary. To support flexibility, in some embodiments, a new Information Element (IE) is used across different domains that reflects the network slice for the used IMS session to enable the terminating domain to select the proper network slice for the target UE. This new IE is referred to herein as a Service Classifier Identifier (SC-ID). One or more NS-IDs can map into a single SC-ID. SC-IDs are standardized across domains (Network-to-Network Interface (NNI)) reflecting network slices. Note that if there is a 1-to-1 mapping between an NS-ID and an SC-ID, they are essentially the same but are labelled differently for flexibility. Note that an SC-ID has to be served by a single S-CSCF. This has to be considered during the mapping of multiple NS-IDs to one SC-ID. Also, note that the SC-ID is optional. For example, the NS-IDs may alternatively be used across different domains, in which case the NS-IDs are preferably standardized.
- A terminating domain that does not receive an SC-ID in an incoming Session Initiation Protocol (SIP) INVITE can successfully terminate that session if the target UE has registered without an NS-ID and in such a case a default S-CSCF is allocated to such a UE.
- Proprietary NS-IDs can map into proprietary SC-IDs. For proprietary SC-IDs, roaming agreements between domains include the proprietary SC-IDs.
- To support Local Breakout (LBO) for Voice Over Long Term Evolution (VoLTE), in this case, NS-IDs must be understood by the roaming partner. If NS-IDs are mapped to SC-IDs, the mapping of NS-IDs to SC-IDs must be understood as well.
- NS-IDs and SC-IDs are stored by the charging servers for proper billing.
- Subscription information includes the list of NS-IDs that an IMPI-IMPU pair is allowed to use. This subscription information is verified at IMS registration.
- UEs are configured with the NS-ID they are subscribed to so that the UE can use them. This can be done by any suitable means and such configuration is not the focus of the present disclosure. In order to ensure that the UE is always updated with any changes, in some embodiments, the UE receives the list of subscribed NS-IDs in the SIP 200 OK to a SIP REGISTER message. These will overwrite any existing NS-IDs. Another alternative is that the UE can be configured with mapping rules from existing Single Network Slice Selection Assistance Information (S-NSSAI) network slicing information to IMS specific slices. Note that S-NSSAI is the term used by the 5GC for a network identifier. The S-NSSAI includes a Slice/Service Type (SST), which refers to the expected network slice behavior in terms of features and services, and a Slice Differentiator (SD), which is optional information that complements the slice/service type(s) to differentiate amongst multiple network slices of the same slice/service type. So, for example, an emergency 5G System (5GS) network slice can map to an IMS emergency network slice or a 5GS enhanced Mobile Broadband (eMBB) network slice can map to an IMS VoLTE network slice. A single 5GS network slice can map into multiple IMS network slices as well. In some embodiments, this mapping is operator dependent and, as such, the mapping is, e.g., shared in roaming agreements between different operators. The IMS client is able to retrieve the 5GS (S-NSSAI) slicing information through appropriate Application Programming Interfaces (APIs).

Certain embodiments may provide one or more of the following technical advantage(s). The present disclosure proposes a simple way to support network slicing in IMS.

Figure 4:
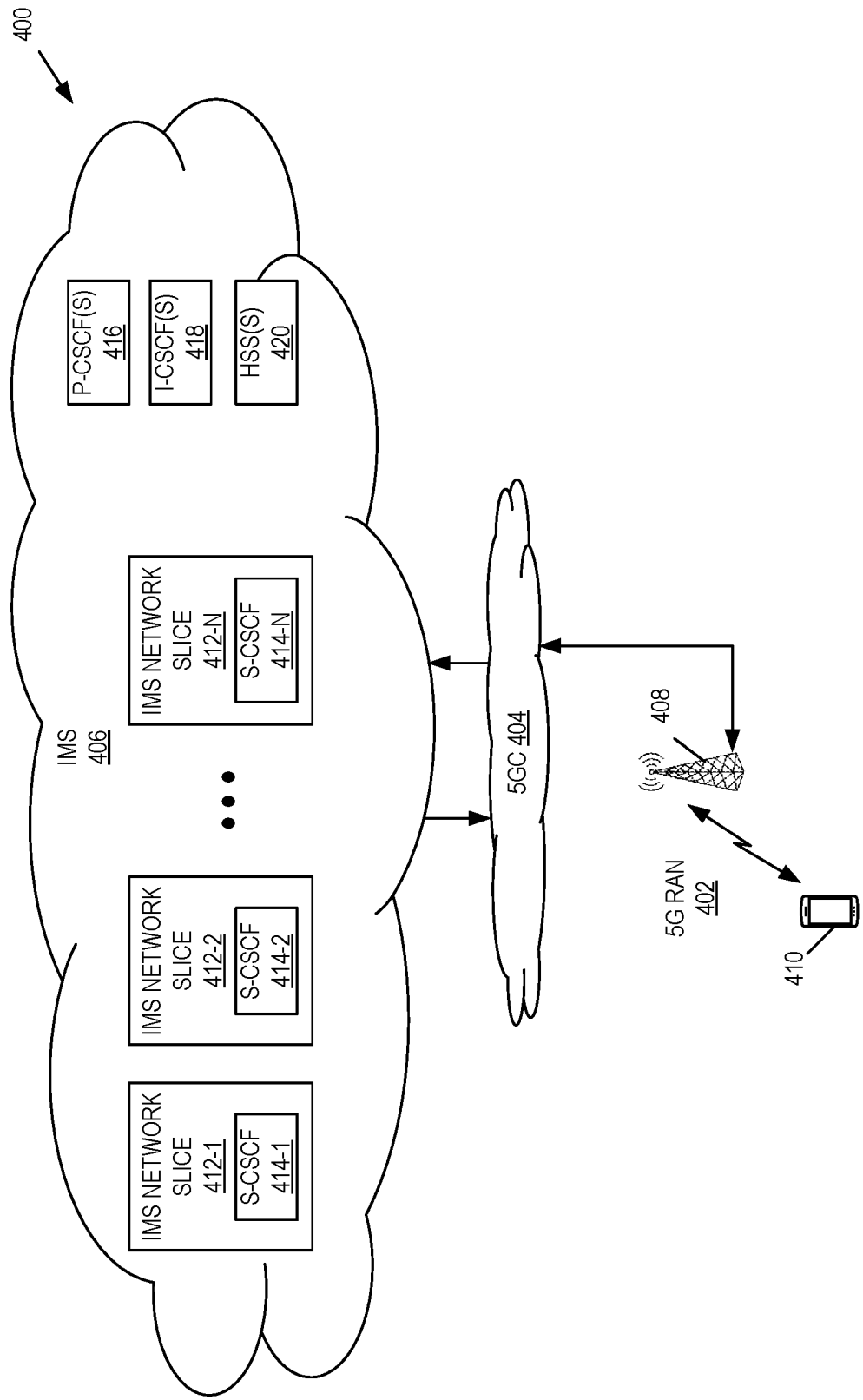
FIG. 4 illustrates one example of a wireless communication system in which embodiments of the present disclosure may be implemented.

FIG. 4 illustrates one example of a wireless communication system 400 in which embodiments of the present disclosure may be implemented. In the embodiments described herein, the wireless communication system 400 is a 5GS including a 5G RAN 402, a 5GC 404, and an IMS 406. As illustrated, the 5G RAN 402 includes a number of base stations 408, which are referred to as gNBs in 3GPP 5G, serving a number of wireless devices 410, which are also referred to herein as UEs 410. The base stations 408 are connected to the 5GC 404. The 5GC 404 is connected to the IMS 406.

In the embodiments described herein, the IMS 406 includes a number of IMS network slices 412-1 through 412-N. The IMS network slices 412-1 through 412-N include respective S-CSCFs 414-1 through 414-N. The IMS network slices 412-1 through 412-N are generally referred to herein as IMS network slices 412, and the S-CSCFs 414-1 through 414-N are generally referred to herein as S-CSCFs 414. The S-CSCFs 414 are virtual nodes.

The IMS 406 also includes one or more P-CSCFs 416, one or more Interrogating Call Session Control Functions (I-CSCFs) 418, and one or more HSSs 420. As discussed above, in some embodiments, different P-CSCFs 416 can be associated with different IMS network slices 412. For example, each P-CSCF 416 may be associated with a different one of the IMS network slices 412 or each P-CSCF 416 may be associated with one or more of the IMS network slices 412.

The following call flows implement at least some embodiments of the solutions described herein.

Figure 5A:
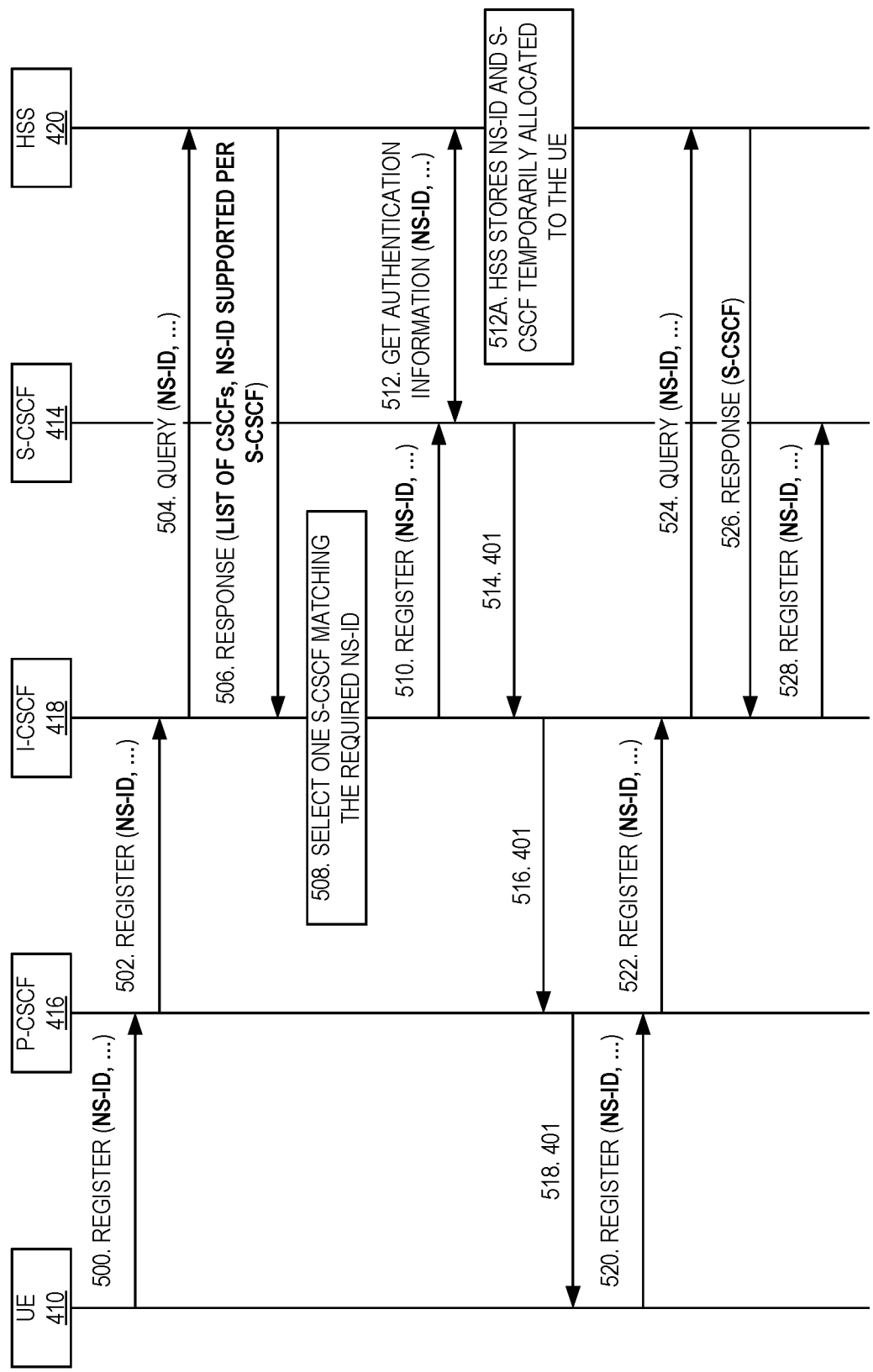
FIGS. 5A and 5B illustrate a call flow for an initial registration for a User Equipment (UE) requesting a particular IMS network slice having a corresponding Network Slice Identifier (NS-ID) in accordance with some embodiments of the present disclosure.
Figure 5B:
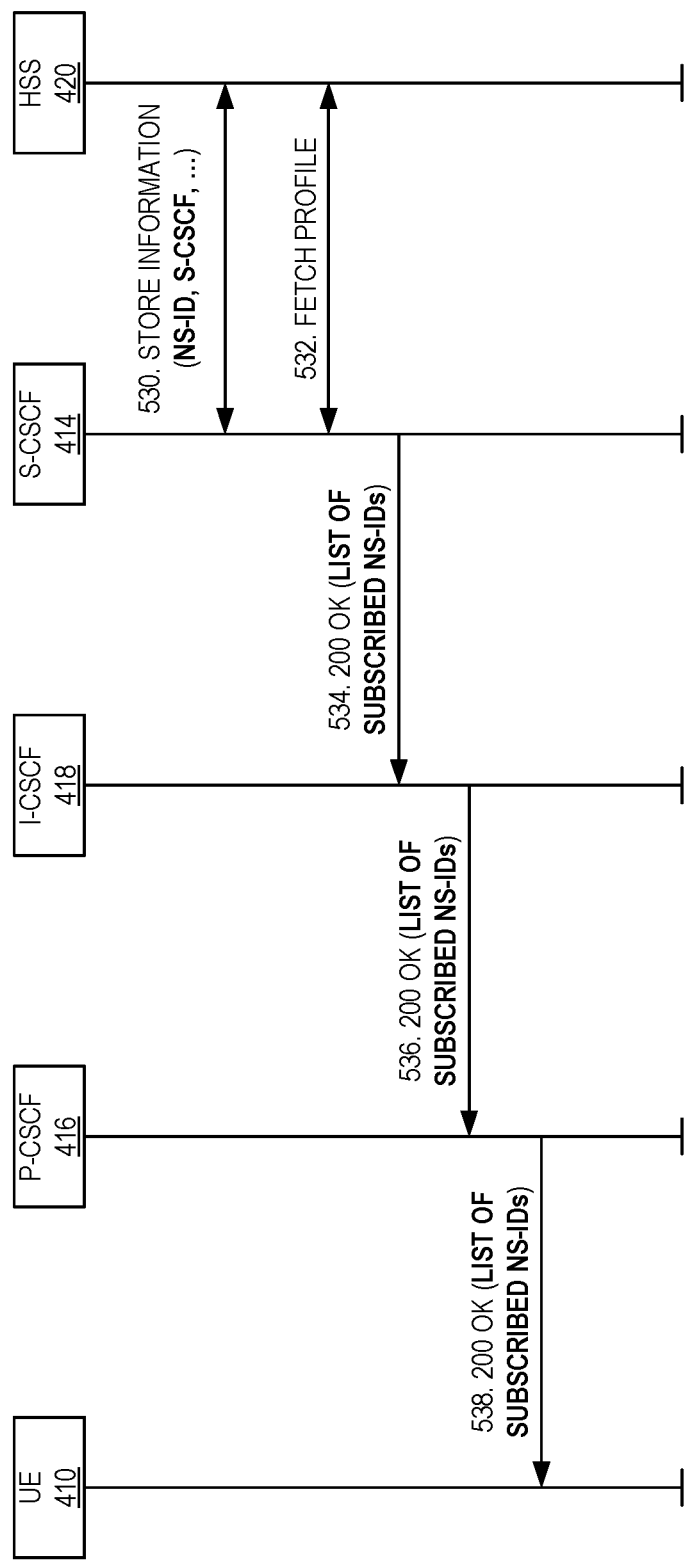

The first call flow in FIGS. 5A and 5B shows an initial registration for a UE 410 requesting a particular IMS network slice 412 having a corresponding NS-ID. Aspects that are shown in bold are the additional information (e.g., IEs) that are additionally included in existing messages. This registration procedure is a standard procedure augmented with the additional elements. As such, the well-known conventional aspects of this procedure are not described in detail.

As illustrated, the UE 410 sends a registration message including the NS-ID of the requested IMS network slice 412 to an appropriate P-CSCF 416 (step 500). The registration message includes additional information such as, e.g., the IMPI and IMPU of the UE 410. The requested IMS network slice 412 is the one of the IMS network slices 412 that is used for a particular service desired by the UE 410. Note that the mapping between the IMS network slices 412 (i.e., the NS-IDs of the IMS network slices 412) and the respective services is known to the UE 410, e.g., via configuration or via a predefined mapping hard-coded or otherwise stored at the UE 410. Also, the appropriate P-CSCF 416 is determined by the UE 410 using any suitable technique, examples of which are described below.

The P-CSCF 416 validates that the requested NS-ID matches capabilities of the P-CSCF 416 and, if so, sends a registration message to an I-CSCF 418 (step 502), where the registration message may be the same registration message received by the P-CSCF 416 in step 500 or may be a different registration message that includes all or a part of the information included in the registration message received by the P-CSCF 416 in step 500. Either way, the registration message sent from the P-CSCF 416 includes the requested NS-ID and the IMPI-IMPU pair for the UE 410.

The I-CSCF 418 queries the HSS 420 (step 504). In this example, the I-CSCF 418 sends a query message to the HSS 420 with a flag set to indicate that the query is for a list of S-CSCFs 414 and NS-IDs supported per S-CSCF. The list of S-CSCFs 414 and the NS-IDs supported by each of the S-CSCFs 414 in the list are, e.g., configured by, e.g., the network operator and stored at the HSS 420. The HSS 420 responds to the query with a response message that includes the list of S-CSCFs 414 and the NS-IDs supported by each of the S-CSCFs 414 (step 506).

The I-CSCF 418 selects one of the S-CSCFs 414 from the list that supports the NS-ID provided in the registration message (step 508). Note that there may be only one S-CSCF 414 that supports the requested NS-ID or there may be more than one S-CSCF 414 that supports the requested NS-ID. If there is more than one S-CSCF 414 that supports the requested NS-ID, then the I-CSCF 418 selects one of those S-CSCFs 414 using any desired selection scheme (e.g., based on one or more additional criteria such as, e.g., load-balancing).

Once the I-CSCF 418 has selected the appropriate S-CSCF 414, the I-CSCF 418 sends a registration message to the S-CSCF 414 (step 510), where the registration message may be the same registration message received by the I-CSCF 418 in step 502 or may be a different registration message that includes all or a part of the information included in the registration message received by the I-CSCF 418 in step 502. Either way, the registration message sent from the I-CSCF 418 to the S-CSCF 414 includes the requested NS-ID and the IMPI-IMPU pair for the UE 410.

The S-CSCF 414 validates that the requested NS-ID matches capabilities of the S-CSCF 414 and, if so, communicates with the HSS 420 to get authentication information for the NS-ID for the IMPI-IMPU pair of the UE 410 (step 512). As part of the authentication process, the HSS 420 stores the NS-ID and S-CSCF Identifier (ID) of the selected S-CSCF 414 temporarily allocated to the UE 410 (step 512A).

In this example, the HSS 420 challenges the UE 410. As such, a 401 message is returned to the UE 410 (steps 514 through 518). Upon receiving the 401 message, the UE 410 sends a registration message to the P-CSCF 416, where the registration message again includes the NS-ID of the desired IMS network slice 412 (step 520), as well as the authentication information.

The P-CSCF 416 validates that the requested NS-ID matches capabilities of the P-CSCF 416 and, if so, sends a registration message to the I-CSCF 418 (step 522), where the registration message may be the same registration message received by the P-CSCF 416 in step 520 or may be a different registration message that includes all or a part of the information included in the registration message received by the P-CSCF 416 in step 520. Either way, the registration message sent from the P-CSCF 416 includes the requested NS-ID and the IMPI-IMPU pair for the UE 410.

The I-CSCF 418 queries the HSS 420 (step 524). Here, the query includes the requested NS-ID. The HSS 420 returns a response message to the I-CSCF 418 that includes the S-CSCF ID of the S-CSCF 414 stored by the HSS 420 in step 512A (step 526).

Once the I-CSCF 418 has received the response from the HSS 420, the I-CSCF 418 sends a registration message to the S-CSCF 414 (step 528), where the registration message may be the same registration message received by the I-CSCF 418 in step 522 or may be a different registration message that includes all or a part of the information included in the registration message received by the I-CSCF 418 in step 522. Either way, the registration message sent from the I-CSCF 418 to the S-CSCF 414 includes the requested NS-ID and the IMPI-IMPU pair for the UE 410.

The S-CSCF 414 validates that the requested NS-ID matches capabilities of the S-CSCF 414 and, if so, communicates with the HSS 420 to store information including the NS-ID and S-CSCF ID of the S-CSCF 414 with respect to the IMPI-IMPU pair of the UE 410 (step 530).

The S-CSCF 414 fetches the profile of the UE 410 from the HSS 420 (step 532). The profile includes a list of NS-IDs of the IMS network slices 412 to which the UE 410 (and in particular the IMPI-IMPU pair of the UE 410) is subscribed. After validating the UE requested NS-ID against the subscribed NS-ID, the S-CSCF 414 sends an OK message to the I-CSCF 418 including the list of NS-IDs of the IMS network slices 412 to which the UE 410 (and in particular the IMPI-IMPU pair of the UE 410) is subscribed (step 534). The I-CSCF 418 sends the OK message to the P-CSCF 416 (step 536), which sends the OK message to the UE 410 (step 538).

The following is to be noted:

What is returned in step 506 is the list of S-CSCFs 414 and the NS-ID(s) they support. If an S-CSCF 414 does not have an NS-ID allocated to it, then it is considered a default S-CSCF 414 and can be allocated to a UE 410 that did not request any specific NS-ID.

In step 530, the HSS 420 stores a separate registration context for each IMPI-IMPU pair that includes the allocated S-CSCF 414 and the NS-ID. In that sense, each registration context for an IMPI-IMPU pair for a NS-ID is equivalent to an IMS registration of today; but the IMPI-IMPU pair can have multiple of those. Note that the UE 410 also maintains separate registrations for each IMS network slice 412 with which it is registered. Also note that various IMS nodes (e.g., S-CSCF and P-CSCF) may also maintain separate registrations for the UE 410 for each IMS network slice 412 per IMPI-IMPU pair.

To ensure that the UE 410 is always updated with any changes, the UE 410 receives (e.g., always) the list of subscribed NS-IDs in the SIP 200 OK to a SIP REGISTER message. These will overwrite any existing NS-IDs.

Figure 6A:
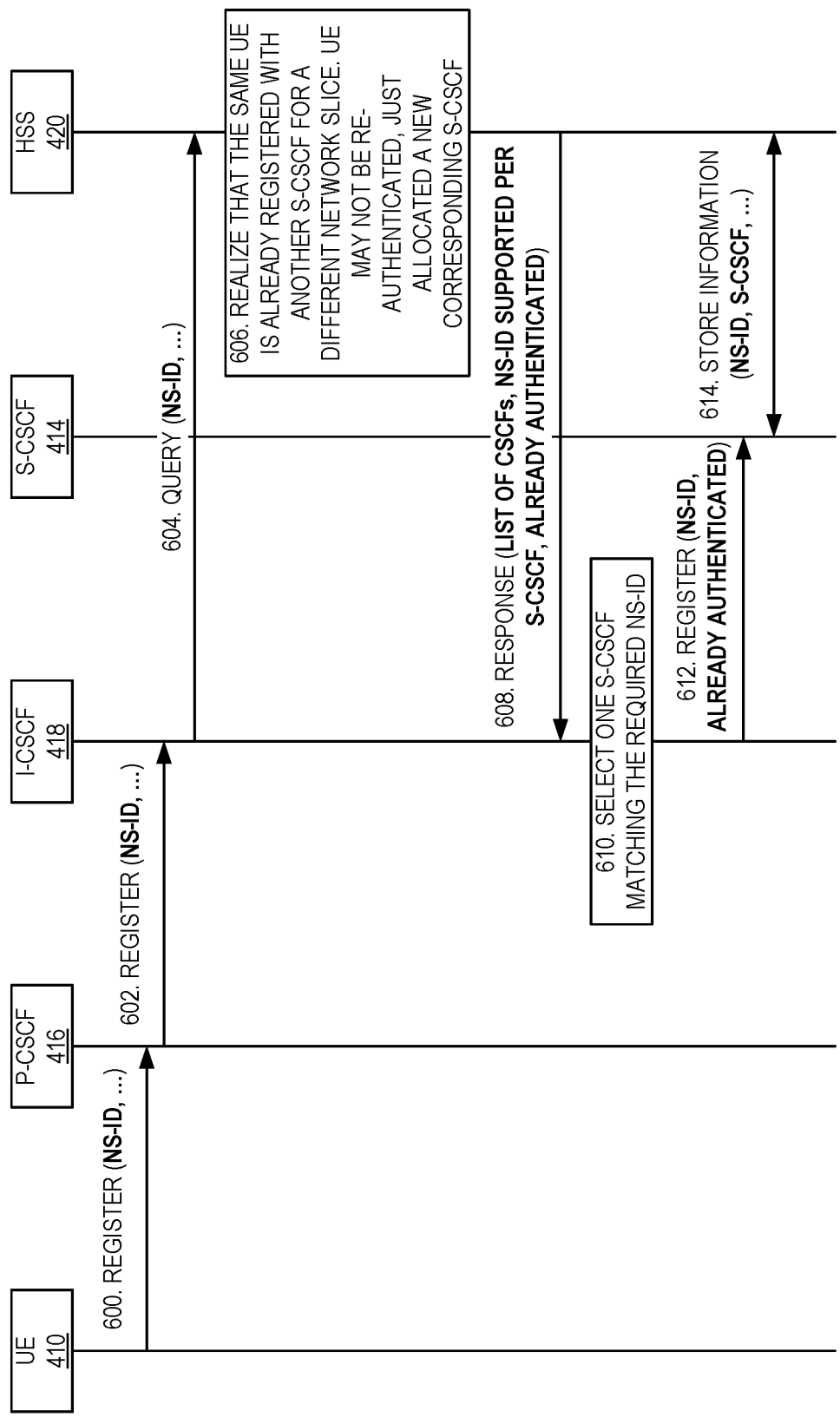
FIGS. 6A and 6B illustrate a call flow in which the same UE of FIGS. 5A and 5B for the same IP Multimedia Private Identity (IMPI)—IP Multimedia Public Identity (IMPU) pair issues a second IMS register request for a new IMS network slice having a new/second NS-ID in accordance with some embodiments of the present disclosure.
Figure 6B:
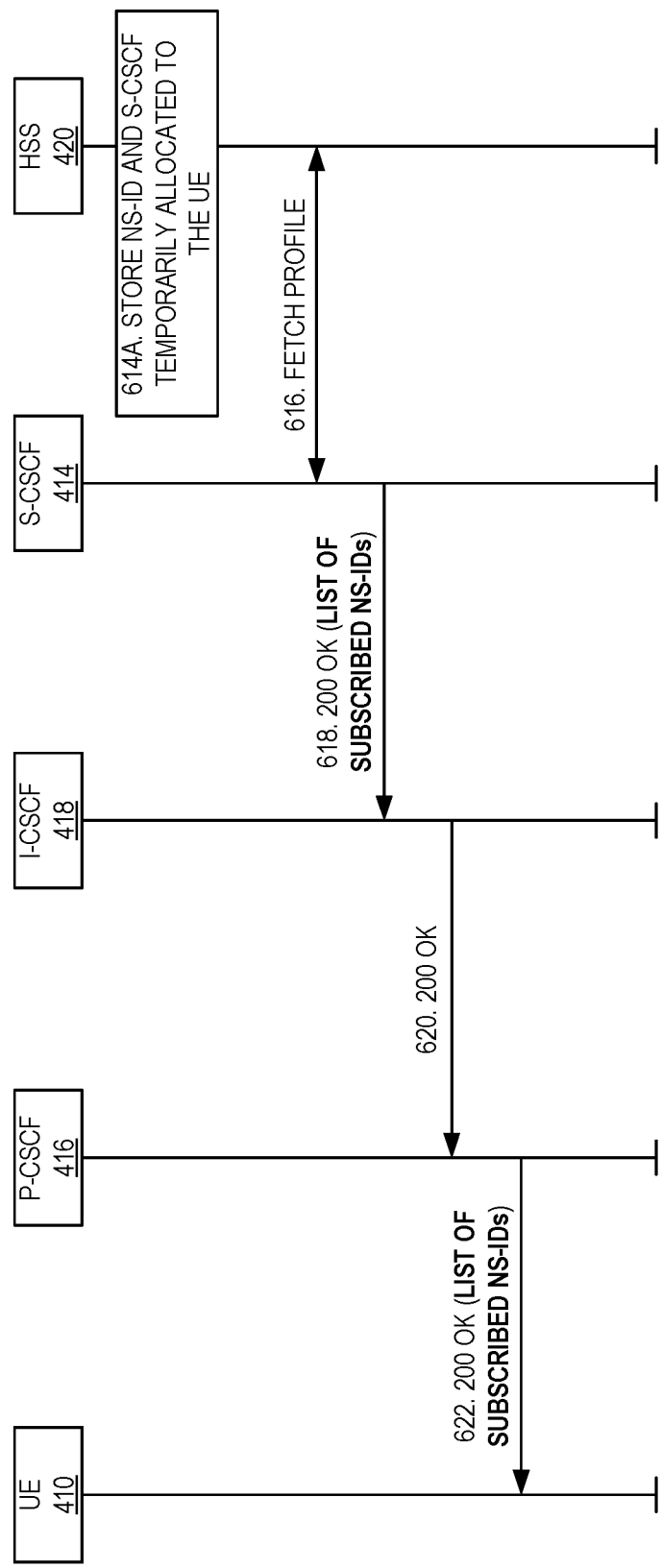

The next call flow shown in FIGS. 6A and 6B shows the same UE 410 for the same IMPI-IMPU pair issuing a second IMS register requesting a new IMS network slice 412 having a new/second NS-ID and using the same credentials as those used in the first IMS registration (e.g., used in the first IMS registration of FIGS. 5A and 5B). Note that while the same IMPI-IMPU pair is used in this example, the same applies for a registration request for a different IMPI-IMPU pair (e.g., the same IMPI but different IMPU).

As illustrated, the UE 410 sends a registration message including the NS-ID of the requested IMS network slice 412 to an appropriate P-CSCF 416 (step 600). The registration message includes additional information such as, e.g., the IMPI and IMPU of the UE 410. The requested IMS network slice 412 is the one of the IMS network slices 412 that is used for a particular service desired by the UE 410. Note that the mapping between the IMS network slices 412 (i.e., the NS-IDs of the IMS network slices 412) and the respective services is known to the UE 410, e.g., via configuration or via a predefined mapping hard-coded or otherwise stored at the UE 410.

As noted above, the NS-ID in the registration message of step 600 is different than the NS-ID in a prior registration message from the same UE 410 for the same IMPI-IMPU pair. The prior IMS registration may be that of FIGS. 5A and 5B.

The P-CSCF 416 validates that the requested NS-ID matches capabilities of the P-CSCF 416 and, if so, sends a registration message to an I-CSCF 418 (step 602), where the registration message may be the same registration message received by the P-CSCF 416 in step 600 or may be a different registration message that includes all or a part of the information included in the registration message received by the P-CSCF 416 in step 600. Either way, the registration message sent from the P-CSCF 416 includes the requested NS-ID and the IMPI-IMPU pair for the UE 410.

The I-CSCF 418 queries the HSS 420 (step 604). In this example, the I-CSCF 418 sends a query message to the HSS 420 with a flag set to indicate that the query is for a list of S-CSCFs 414 and NS-IDs supported per S-CSCF 414. The list of S-CSCFs 414 and the NS-IDs supported by each of the S-CSCFs 414 in the list are, e.g., configured by, e.g., the network operator and stored at the HSS 420. The HSS 420 realizes that the same UE 410 (i.e., the same IMPI-IMPU pair) is already registered for another S-CSCF 414 for another IMS network slice 412. As such, the HSS 420 may choose to not re-authenticate the UE 410 if, e.g., the same credentials are being used (step 606). The HSS 420 responds to the query with a response message that includes the list of S-CSCFs 414 and the NS-IDs supported by each of the S-CSCFs 414 (step 608). Assuming that the HSS 420 chooses not to re-authenticate the UE 410, the response also includes an indication that the UE 410 is already authenticated (i.e., that re-authentication is not needed).

The I-CSCF 418 selects one of the S-CSCFs 414 from the list that supports the NS-ID provided in the registration message (step 610). Note that there may be only one S-CSCF 414 that supports the requested NS-ID or there may be more than one S-CSCF 414 that supports the requested NS-ID. If there is more than one S-CSCF 414 that supports the requested NS-ID, then the I-CSCF 418 selects one of those S-CSCFs 414 using any desired selection scheme (e.g., based on one or more additional criteria such as, e.g., load-balancing).

Once the I-CSCF 418 has selected the appropriate S-CSCF 414, the I-CSCF 418 sends a registration message to the S-CSCF 414 (step 612), where the registration message includes all or a part of the information included in the registration message received by the I-CSCF 418 in step 602. The registration message sent from the I-CSCF 418 to the S-CSCF 414 includes the requested NS-ID and the IMPI-IMPU pair for the UE 410. In addition, the registration message includes an indication that the UE 410 is already authenticated.

The S-CSCF 414 validates that the requested NS-ID matches capabilities of the S-CSCF 414 and, if so, communicates with the HSS 420 to store information including the NS-ID and S-CSCF ID of the S-CSCF 414 with respect to the IMPI-IMPU pair of the UE 410 (step 614). As part of this process, the HSS 420 stores the NS-ID and S-CSCF ID of the S-CSCF 414 allocated to the UE 410 (e.g., allocated to the IMPI-IMPU pair of the UE 410) (step 614A).

The S-CSCF 414 fetches the profile of the UE 410 from the HSS 420 (step 616). The profile includes a list of NS-IDs of the IMS network slices 412 to which the UE 410 (and in particular the IMPI-IMPU pair of the UE 410) is subscribed. After validating the UE requested NS-ID against the subscribed NS-ID, the S-CSCF 414 sends an OK message to the I-CSCF 418 including the list of NS-IDs of the IMS network slices 412 to which the UE 410 (and in particular the IMPI-IMPU pair of the UE 410) is subscribed (step 618). The I-CSCF 418 sends the OK message to the P-CSCF 416 (step 620), which sends the OK message to the UE 410 (step 622).

In this call flow note that in step 606 the HSS 420 decides not to challenge authenticate the UE 410 and returns such an indication in addition to the list of S-CSCFs 414 and the NS-IDs they support to the I-CSCF 418 in step 608.

At the end of the call flow, the HSS 420 has two separate registration contexts for the same IMPI-IMPU pair.

If this new IMS registration was for a different IMPI-IMPU pair from one used in the first call flow shown in FIGS. 5A and 5B, then the UE 410 would have two IMPI-IMPU pairs each with a single registration context. Also, if different credentials are used, then the HSS 420 may choose to re-authenticate the UE 410 and, as such, may challenge the UE 410.

Figure 7A:
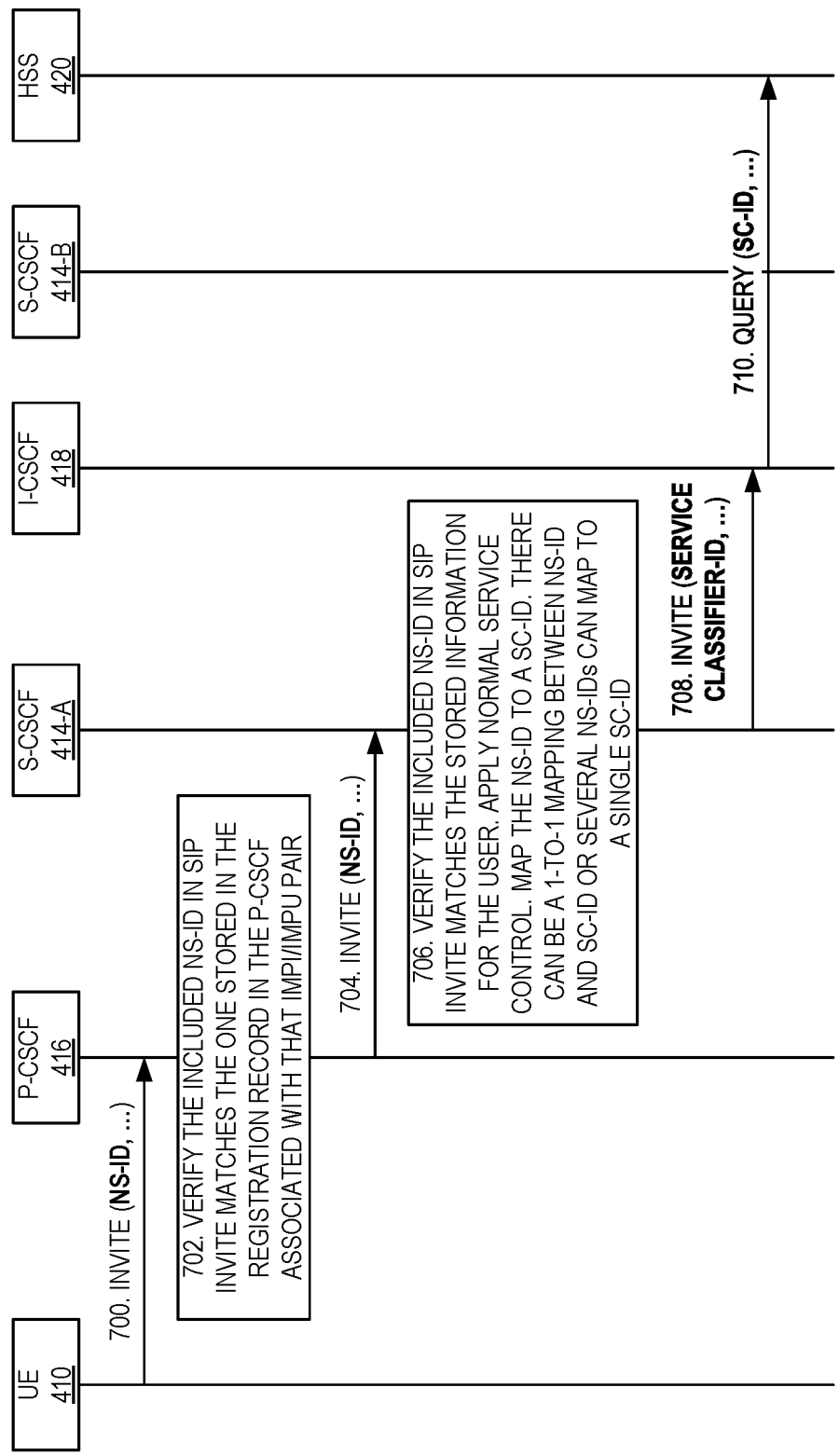
FIGS. 7A and 7B illustrate a call flow for an IMS session initiation request in which information goes across domains in accordance with some embodiments of the present disclosure.
Figure 7B:
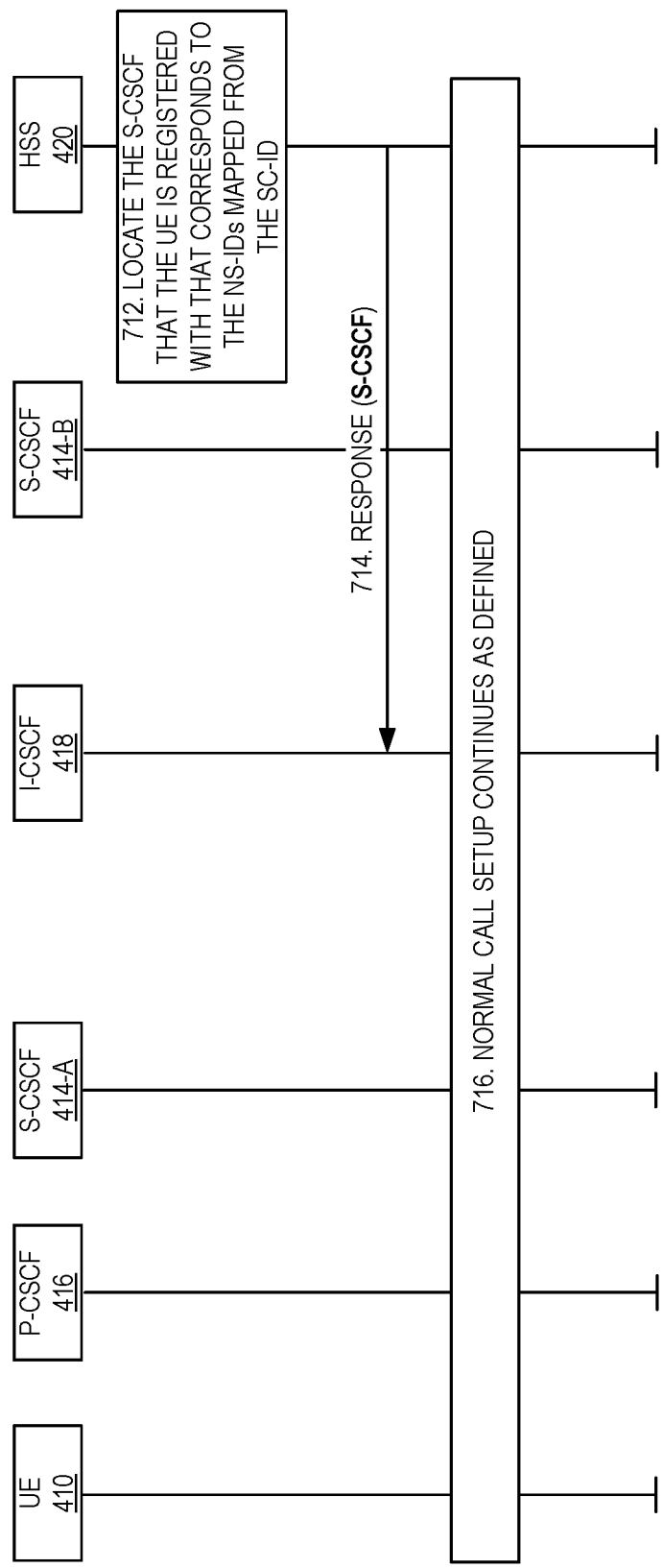

The next call flow shown in FIGS. 7A and 7B shows an IMS session initiation request and the information that goes across domains.

As illustrated, the UE 410 sends a SIP INVITE to an appropriate P-CSCF 416, where the INVITE includes a NS-ID of a desired IMS network slice 412 (step 700). The P-CSCF 416 verifies that the NS-ID included in the INVITE matches the one stored in the registration record in the P-CSCF associated with that IMPI-IMPU pair (step 702). After successful validation, the P-CSCF 416 sends the INVITE to the S-CSCF 414-A for the IMS network slice 412 having the NS-ID included in the INVITE (step 704).

In step 706, the S-CSCF 414-A verifies that the NS-ID included in the INVITE matches the capabilities of the S-CSCF 414-A and matches stored information for the UE 410 (i.e., for the corresponding IMPI-IMPU pair). The S-CSCF 414-A also applies normal service control. In this example, the S-CSCF 414-A maps the NS-ID to a SC-ID in accordance with a predefined mapping between NS-IDs and SC-IDs. As discussed above, there may be a one-to-one mapping between NS-IDs and SC-IDs or, alternatively, there may be a one-to-M mapping between NS-IDs and SC-IDs (where M can be 1, 2, 3, . . . ).

Note that the use of an SC-ID is optional. In some alternative embodiments, the NS-ID is used in lieu of an SC-ID.

The S-CSCF 414-A sends an INVITE to an I-CSCF 418, where the INVITE includes the SC-ID determined by the S-CSCF 414-A (step 708). The I-CSCF 418 sends a query to the HSS 420 including the SC-ID (step 710). The HSS 420 locates the S-CSCF 414-B that the target UE is registered with and corresponds to the NS-ID(s) mapped to the SC-ID (step 712). The HSS 420 sends a response to the I-CSCF 418 including an S-CSCF ID of the S-CSCF 414-B located by the HSS 420 (step 714). From here, the normal call setup procedure continues (step 716).

In the process of FIGS. 7A and 7B, it can be seen that the NS-ID is included in the INVITE. The additional behavior for the various nodes is depicted clearly in FIGS. 7A and 7B. The S-CSCF 414-A maps the NS-ID to the corresponding SC-ID.

At the terminating domain, the I-CSCF 418 queries the HSS 420 with the received SC-ID and the target IMPU. The HSS 420 searches its database, locates the target IMPU, locates the registration context for the target IMPU, and matches the received SC-ID with the corresponding NS-ID. If a registration context with the NS-ID is located, the S-CSCF ID of the allocated S-CSCF 414-B is returned to the UE 410.

In the case where the SC-ID maps into more than one NS-ID, then any NS-ID is matched for a registration context.

The NS-ID and the SC-ID are transferred to the appropriate Policy and Charging Rules Function (PCRF) for the originating and terminating domain. This enables the charging server to capture all this needed information for charging purpose as well as other purposes.

To enable the UE 410 to discover (i.e., to select) the appropriate P-CSCF 416, e.g., when sending the registration message/request in step 500, when sending the registration message/request in step 600, any appropriate discovery or selection scheme may be used. Two example P-CSCF discovery schemes are as follows:

In a first example, at Packet Data Network (PDN) connection setup in Evolved Packet Core (EPC) or session setup in 5GC, the information returned to the UE 410 includes: one or more Fully Qualified Domain Names (FQDNs) of one or more P-CSCFs 416, respectively; and, for each FQDN, a list of NS-IDs supported by the corresponding P-CSCF 416. Different FQDNs may be used, one per NS-ID. The UE 410 selects the FQDN of the P-CSCF 416 for a desired IMS network slice 412 (i.e., for the desired NS-ID). Note that, in one example alternative, the information returned to the UE 410 includes separate IP addresses for each IMS network slice 412 for each P-CSCF 416.

In a second example, at PDN connection setup in EPC or session setup in 5GC, the information returned to the UE 410 includes FQDNs for P-CSCFs 416 where the FQDNs include a NS-ID part that identifies the respective NS-IDs. Thus, for a particular P-CSCF 416 that supports two NS-IDs, the UE 410 obtains a first FQDN and a second FQDN, where the NS-ID part of the first FQDN corresponds to the first NS-ID supported by that particular P-CSCF 416 and the NS-ID part of the second FQDN corresponds to the first ND-ID supported by that particular P-CSCF 416. This enables the UE 410 to select the appropriate FQDN accordingly.

It should be noted that, in some embodiments, there is a relationship between IMS network slicing and a 5GS network slicing (5GS network slicing also known as network slicing, where a network slice corresponds to a logical network including 5G RAN and 5GC as specified 3GPP 23.501 V15.0.0). In some embodiments, the UE 410 can be configured with a mapping from existing 5GS S-NSSAI network slicing information to IMS specific network slices. So, for example, an emergency 5GS network slice can map to an IMS emergency network slice, or an eMBB 5GS network slice can map into an IMS VoLTE network slice. A single 5GS network slice can map into multiple IMS network slices as well. This mapping is operator dependent and, in some embodiments, is included in roaming agreements between different operators. In some embodiments, the IMS client at the UE 410 retrieves the 5GS S-NSSAI network slicing information through appropriate APIs.

Figure 8:
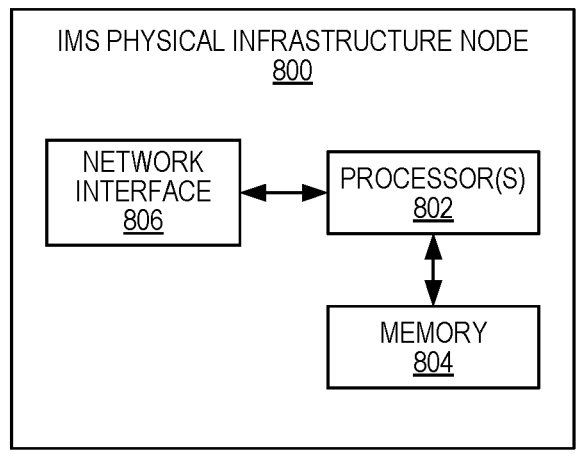
FIGS. 8 and 9 illustrate example embodiments of an IMS physical infrastructure node.

FIG. 8 is a schematic block diagram of an IMS physical infrastructure node 800. The IMS network slices 412 are logical or virtual networks that are implemented using virtualization technology on a number of IMS physical infrastructure nodes such as the IMS physical infrastructure node 800. In this regard, the S-CSCFs 414 and, in some embodiments, the P-CSCF(s) 416, the I-CSCF(s) 418, and/or the HSS 420 are implemented as virtual nodes operating on a number of IMS physical infrastructure nodes 800. Note, however, that some of the IMS nodes (e.g., the P-CSCF(s) 416, the I-CSCF(s) 418, and/or the HSS 420) may alternatively be implemented as physical nodes (i.e., as physical infrastructure nodes).

In this regard, as illustrated in FIG. 8, the IMS physical infrastructure node 800 includes one or more processors 802 (e.g., Central Processing Units (CPUs), Application Specific Integrated Circuits (ASICs), Field Programmable Gate Arrays (FPGAs), and/or the like), memory 804, and a network interface(s) 806. In some embodiments, using virtualization, the IMS nodes (the S-CSCFs 414 and, in some embodiments, the P-CSCF(s) 416, the I-CSCF(s) 418, and/or the HSS 420) are implemented as virtual nodes that utilize physical resources (e.g., the processor(s) 802, the memory 804, and the network interface(s) 806 of one or more of the IMS physical infrastructure nodes 800.

In some embodiments, a computer program including instructions which, when executed by at least one processor, causes the at least one processor to carry out the functionality of an IMS node according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
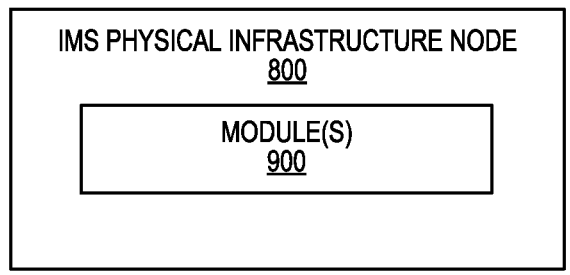

FIG. 9 is a schematic block diagram of the IMS physical infrastructure node 800 according to some other embodiments of the present disclosure. The IMS physical infrastructure node 800 includes one or more modules 900, each of which is implemented in software. The module(s) 900 provide the functionality of one or more of the IMS nodes described herein.

Figure 10:
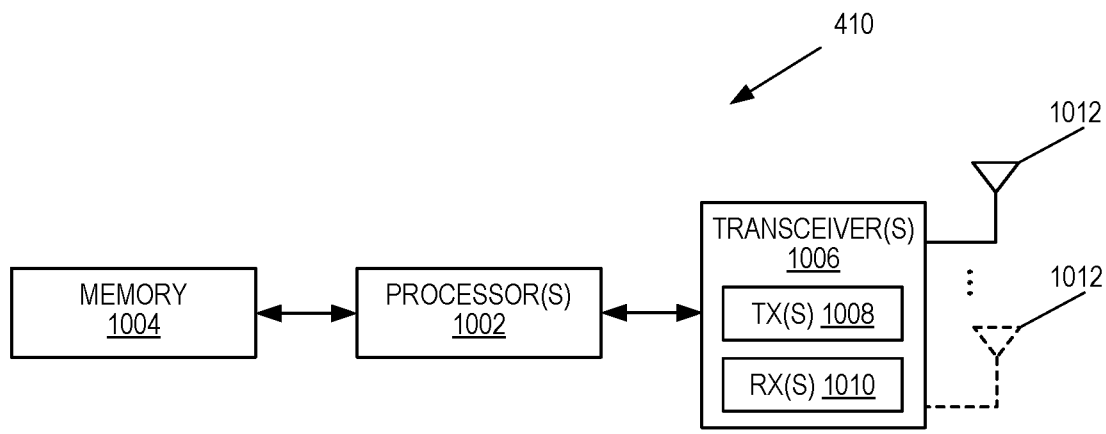
FIGS. 10 and 11 illustrate example embodiments of a UE.

FIG. 10 is a schematic block diagram of a UE 410 according to some embodiments of the present disclosure. As illustrated, the UE 410 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. In some embodiments, the functionality of the UE 410 described above may be fully or partially implemented in software that is, e.g., stored in the memory 1004 and executed by the processor(s) 1002.

In some embodiments, a computer program including instructions which, when executed by at least one processor, causes the at least one processor to carry out the functionality of the UE 410 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
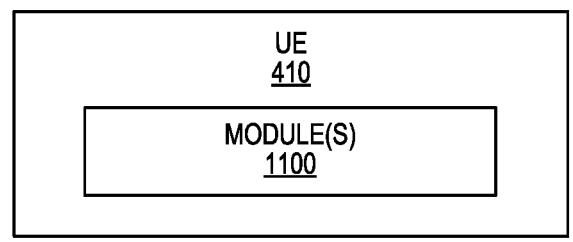

FIG. 11 is a schematic block diagram of the UE 410 according to some other embodiments of the present disclosure. The UE 410 includes one or more modules 1100, each of which is implemented in software. The module(s) 1100 provide the functionality of the UE 410 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments are as follows:

Embodiment 1

A method performed by a wireless device (410) relating to registering with an Internet Protocol Multimedia Subsystem, IMS, network slice (412) or initiating a session using an IMS network slice (412), the method comprising: sending (500, 700) a message to an IMS node (416) via a radio access network, the message comprising an identifier of a desired IMS network slice (412).

Embodiment 2

The method of embodiment 1 wherein the message is a first registration message for registration of the wireless device (410) with the desired IMS network slice (412).

Embodiment 3

The method of embodiment 2 wherein the message comprises an Internet Protocol Multimedia Private Identity, IMPI, of the wireless device (410).

Embodiment 4

The method of embodiment 3 wherein the message further comprises an Internet Protocol Multimedia Public Identity, IMPU, of the wireless device (410).

Embodiment 5

The method of embodiment 3 wherein the message further comprises information that indicates a plurality of Internet Protocol Multimedia Public Identities, IMPUs, of the wireless device (410).

Embodiment 6

The method of any one of embodiments 2 to 5 further comprising sending (600) a second registration message to an IMS node (416) via the radio access network, the second registration message comprising an identifier of a second desired IMS network slice (412).

Embodiment 7

The method of embodiment 6 wherein the first registration message and the second registration message are for a same IMPI-IMPU pair of the wireless device (410).

Embodiment 8

The method of embodiment 7 wherein separate registration contexts are created and stored in the IMS for the registration of the IMPI-IMPU pair with the desired IMS network slice (412) and the second desired IMS network slice (412).

Embodiment 9

The method of embodiment 6 wherein the first registration message and the second registration message are for a same IMPI of the wireless device (410) but different IMPUs of the wireless device (410).

Embodiment 10

The method of embodiment 9 wherein separate registration contexts are created and stored in the IMS for the registration of the wireless device (410) with the desired IMS network slice (412) and the second desired IMS network slice (412).

Embodiment 11

The method of embodiment 6 wherein the first registration message and the second registration message are for different IMPIs of the wireless device (410) and different IMPUs of the wireless device (410).

Embodiment 12

The method of any one of embodiments 6 through 11 further comprising maintaining separate registrations for the wireless device (410) for each of the desired IMS network slices (412).

Embodiment 13

The method of any one of embodiments 2 to 12 further comprising receiving a response from the IMS node (416) comprising a list of identifiers of IMS network slices (412) to which the wireless device (410) is subscribed.

Embodiment 14

The method of embodiment 1 wherein the message is a Session Initiation Protocol, SIP, INVITE.

Embodiment 15

The method of any one of embodiments 1 to 14 wherein sending the message comprises sending the message to a Proxy Call Session Control Function, P-CSCF, and the method further comprises selecting the P-CSCF from two or more P-CSCFs.

Embodiment 16

The method of any one of embodiments 1 to 14 wherein sending the message comprises sending the message to a selected Proxy Call Session Control Function, P-CSCF, and the method further comprises selecting the P-CSCF from two or more P-CSCFs based on the identifier of the desired IMS network slice (412).

Embodiment 17

The method of embodiment 16 wherein selecting the P-CSCF from the two or more P-CSCFs based on the identifier of the desired IMS network slice (412) comprises: obtaining two or more Fully Qualified Domain Names, FQDNs, or two or more Internet Protocol, IP, addresses for the two or more P-CSCFs, respectively; obtaining information that indicates one or more supported IMS network slices (412) for each P-CSCF of the two or more P-CSCFs; and selecting, based on the information that indicates one or more supported IMS network slices (412) for each P-CSCF of the two or more P-CSCFs, one of the two or more P-CSCFs that supports the desired IMS network slice (412) as the selected P-CSCF to which to send the message.

Embodiment 18

The method of embodiment 17 wherein selecting the P-CSCF from the two or more P-CSCFs based on the identifier of the desired IMS network slice (412) comprises: obtaining FQDNs for the two or more P-CSCFs for each supported IMS network slice (412), wherein each of the FQDNs includes a network slice identifier part that identifies a corresponding IMS network slice (412); and selecting, based on a comparison of the identifier of the desired IMS network slice (412) and the network slice identifier part of the FQDNs, one of the FQDNs as a FQDN for sending the message.

Embodiment 19

The method of any one of embodiments 1 to 18 wherein the identifier of the IMS network slice (412) is mapped to one or more Fifth Generation System, 5GS, network slices.

Embodiment 20

A wireless device (410) for registering with an Internet Protocol Multimedia Subsystem, IMS, network slice (412) or initiating a session using an IMS network slice (412), the wireless device (410) adapted to perform the method of any one of embodiments 1 to 19.

Embodiment 21

A wireless device (410) for registering with an Internet Protocol Multimedia Subsystem, IMS, network slice (412) or initiating a session using an IMS network slice (412), the wireless device (410) comprising: one or more transmitters (1008) and one or more receivers (1010) operable to provide wireless transmission and reception using a radio access network; one or more processors (1002); and memory (1004) comprising instructions executable by the one or more processors (1002) whereby the wireless device (410) is operable to perform the method of any one of embodiments 1 to 19.

Embodiment 22

A wireless device (410) for registering with an Internet Protocol Multimedia Subsystem, IMS, network slice (412) or initiating a session using an IMS network slice (412), the wireless device (410) comprising one or more modules (1100) operable to perform the method of any one of embodiments 1 to 19.

Embodiment 23

A method performed by an Internet Protocol Multimedia Subsystem, IMS, node relating to registering a wireless device (410) with an IMS network slice (412) or initiating a session for the wireless device (410) using an IMS network slice (412), the method comprising: receiving a message comprising an identifier of a desired IMS network slice (412), the desired IMS network slice (412) being an IMS network slice (412) with which a wireless device (410) desires to register or an IMS network slice (412) on which a wireless device (410) is initiating a session.

Embodiment 24

The method of embodiment 23 wherein the IMS node is a Proxy Call Session Control Function, P-CSCF, (416) and the message is a first registration message for registration of the wireless device (410) with the desired IMS network slice (412) such that receiving the message comprises receiving (500) the message from the wireless device (410).

Embodiment 25

The method of embodiment 24 wherein the message comprises an Internet Protocol Multimedia Private Identity, IMPI, of the wireless device (410).

Embodiment 26

The method of embodiment 25 wherein the message further comprise an Internet Protocol Multimedia Public Identity, IMPU, of the wireless device (410).

Embodiment 27

The method of embodiment 25 wherein the message further comprises information that indicates a plurality of Internet Protocol Multimedia Public Identities, IMPUs, of the wireless device (410).

Embodiment 28

The method of any one of embodiments 24 to 27 further comprising receiving (600) a second registration message from the wireless device (410), the second registration message comprising an identifier of a second desired IMS network slice (412).

Embodiment 29

The method of embodiment 28 wherein the first registration message and the second registration message are for a same IMPI-IMPU pair of the wireless device (410).

Embodiment 30

The method of embodiment 29 wherein separate registration contexts are created and stored in the IMS for the registration of the IMPI-IMPU pair with the desired IMS network slice (412) and the second desired IMS network slice (412).

Embodiment 31

The method of embodiment 28 wherein the first registration message and the second registration message are for a same IMPI of the wireless device (410) but different IMPUs of the wireless device (410).

Embodiment 32

The method of embodiment 31 wherein separate registration contexts are created and stored in the IMS for the registration of the wireless device (410) with the desired IMS network slice (412) and the second desired IMS network slice (412).

Embodiment 33

The method of embodiment 28 wherein the first registration message and the second registration message are for different IMPIs of the wireless device (410) and different IMPUs of the wireless device (410).

Embodiment 34

The method of any one of embodiments 28 through 33 further comprising maintaining separate registrations for the wireless device (410) for each of the desired IMS network slices.

Embodiment 35

The method of any one of embodiments 28 to 34 further comprising sending (502) a registration message comprising the identifier of the second desired IMS network slice (412) to an Interrogating Call Session Control Function, I-CSCF.

Embodiment 36

The method of embodiment 35 further comprising validating that the identifier of the second desired IMS network slice (412) is supported by the P-CSCF (416) prior to sending the registration message to the I-CSCF.

Embodiment 37

The method of any one of embodiments 24 to 36 further comprising sending (502) a registration message comprising the identifier of the desired IMS network slice (412) to an I-CSCF.

Embodiment 38

The method of embodiment 37 further comprising validating that the identifier of the desired IMS network slice (412) is supported by the P-CSCF (416) prior to sending the registration message to the I-CSCF.

Embodiment 39

The method of embodiment 23 wherein the IMS node is a Proxy Call Session Control Function, P-CSCF, (416) and the message is a Session Initiation Protocol, SIP, INVITE.

Embodiment 40

The method of embodiment 39 further comprising: verifying (702) that the identifier of the desired IMS network slice (412) is supported by the P-CSCF (416); and sending (704) a SIP INVITE comprising the identifier of the desired IMS network slice (412) to a Serving Call Session Control Function, S-CSCF, (414) comprised in the desired IMS network slice (412).

Embodiment 41

The method of embodiment 23 wherein the IMS node is an Interrogating Call Session Control Function, I-CSCF, (418), the message is a first registration message for registration of the wireless device (410) with the desired IMS network slice (412), and receiving the message comprises receiving (502) the message from a Proxy Call Session Control Function, P-CSCF, (416).

Embodiment 42

The method of embodiment 41 wherein the message comprises an Internet Protocol Multimedia Private Identity, IMPI, of the wireless device (410).

Embodiment 43

The method of embodiment 42 wherein the message further comprise an Internet Protocol Multimedia Public Identity, IMPU, of the wireless device (410).

Embodiment 44

The method of embodiment 42 wherein the message further comprises information that indicates a plurality of Internet Protocol Multimedia Public Identities, IMPUs, of the wireless device (410).

Embodiment 45

The method of any one of embodiments 41 to 44 further comprising receiving (602) a second registration message for registration of the wireless device (410) with a second desired IMS network slice (412), the second registration message comprising an identifier of a second desired IMS network slice (412).

Embodiment 46

The method of embodiment 45 wherein the first registration message and the second registration message are for a same IMPI-IMPU pair of the wireless device (410).

Embodiment 47

The method of embodiment 46 wherein separate registration contexts are created and stored in the IMS for the registration of the IMPI-IMPU pair with the desired IMS network slice (412) and the second desired IMS network slice (412).

Embodiment 48

The method of embodiment 45 wherein the first registration message and the second registration message are for a same IMPI of the wireless device (410) but different IMPUs of the wireless device (410).

Embodiment 49

The method of embodiment 48 wherein separate registration contexts are created and stored in the IMS for the registration of the wireless device (410) with the desired IMS network slice (412) and the second desired IMS network slice (412).

Embodiment 50

The method of embodiment 45 wherein the first registration message and the second registration message are for different IMPIs of the wireless device (410) and different IMPUs of the wireless device (410).

Embodiment 51

The method of any one of embodiments 45 to 50 further comprising sending (604) a query to a Home Subscriber Service, HSS, (420), the query comprising the identifier of the second desired IMS network slice (412).

Embodiment 52

The method of embodiment 51 further comprising receiving a response from the HSS (420), the response comprising a list of Serving Call Session Control Functions, S-CSCFs, (414) and identifiers of IMS network slices (412) supported by each S-CSCF (414) in the list of S-CSCFs (414).

Embodiment 53

The method of embodiment 52 wherein the response further comprises an indication that the wireless device (410) is already authenticated.

Embodiment 54

The method of embodiment 52 or 53 further comprising: selecting (610) one of the S-CSCFs (414) that supports the second desired IMS network slice (412) as a selected S-CSCF (414) for the second desired IMS network slice (412); and sending (612) a registration message to the selected S-CSCF (414) for the second desired IMS network slice (412) comprising the identifier of the second desired IMS network slice (412).

Embodiment 55

The method of embodiment 54 wherein the registration message sent to the selected S-CSCF (414) for the second desired IMS network slice (412) further comprises an indication that the wireless device (410) is already authenticated.

Embodiment 56

The method of any one of embodiments 41 to 55 further comprising: sending (504) a query to a HSS (420); and receiving (506) a response from the HSS (420), the response comprising a list of S-CSCFs (414) and identifiers of IMS network slices (412) supported by each S-CSCF (414) in the list of S-CSCFs (414).

Embodiment 57

The method of embodiment 56 further comprising: selecting (508) one of the S-CSCFs (414) that supports the desired IMS network slice (412) as a selected S-CSCF (414) for the desired IMS network slice (412); and sending (510) a registration message to the selected S-CSCF (414) for the desired IMS network slice (412) comprising the identifier of the desired IMS network slice (412).

Embodiment 58

The method of embodiment 23 wherein the IMS node is an Interrogating Call Session Control Function, I-CSCF, (418) and the message is a Session Initiation Protocol, SIP, INVITE.

Embodiment 59

The method of embodiment 23 wherein the IMS node is a Serving Call Session Control Function, S-CSCF, (414), the message is a registration message for registration of the wireless device (410) with the desired IMS network slice (412), and receiving the message comprises receiving (510) the message from an Interrogating Call Session Control Function, I-CSCF, (418).

Embodiment 60

The method of embodiment 59 wherein the message comprises an Internet Protocol Multimedia Private Identity, IMPI, of the wireless device (410).

Embodiment 61

The method of embodiment 60 wherein the message further comprise an Internet Protocol Multimedia Public Identity, IMPU, of the wireless device (410).

Embodiment 62

The method of embodiment 60 wherein the message further comprises information that indicates a plurality of Internet Protocol Multimedia Public Identities, IMPUs, of the wireless device (410).

Embodiment 63

The method of any one of embodiments 59 to 62 further comprising communicating (512) with a Home Subscriber Service, HSS, (420) to get authentication information regarding authentication of the wireless device (410) with the desired IMS network slice (412).

Embodiment 64

The method of any one of embodiments 59 to 62 further comprising communicating (530) with a Home Subscriber Service, HSS, (420) to store information regarding registration of the wireless device (410) with the desired IMS network slice (412), the information being for a particular IMPI-IMPU pair of the wireless device (410) and the desired IMS network slice (412) such that this information is separate from any information stored for different IMPI-IMPU pairs for the same or different IMS network slices and for the same IMPI-IMPU pair for different IMS network slices.

Embodiment 65

The method of embodiment 64 wherein the stored information for the desired IMS network slice is separate from information stored for the wireless device (410) regarding one or more different IMS network slices with which the wireless device (410) is registered.

Embodiment 66

The method of embodiment 63 or 64 further comprising validating that the identifier of the desired IMS network slice (412) is supported by the S-CSCF (416) prior to communicating with the HSS (420).

Embodiment 67

The method of embodiment 23 wherein the IMS node is a Home Subscriber Service, HSS, (420) the message is a query received from an Interrogating Call Session Control Function, I-CSCF, (418), the query comprising the identifier of the desired IMS network slice (412).

Embodiment 68

The method of embodiment 67 further comprising sending (526) a response to the I-CSCF (418), the response comprising an identifier of a Serving Call Session Control Function, S-CSCF, (414) previously selected and stored for the wireless device (410) for the desired IMS network slice (412).

Embodiment 69

The method of embodiment 67 further comprising: determining (606) that the wireless device (410) is already registered with a Serving Call Session Control Function, S-CSCF, (414) for a different IMS network slice (412) and that re-authentication of the wireless device (410) is not needed; and sending (608) a response to the I-CSCF (418), the response comprising: a list of S-CSCFs (414); identifiers of IMS network slices (412) supported by each S-CSCF (414) in the list of S-CSCFs (414); and an indication that the wireless device (410) is already authenticated.

Embodiment 70

The method of any one of embodiments 67 to 69 wherein the HSS (420) maintains separate registration contexts for the wireless device (410) for each of two or more IMS network slices with which the wireless device (410) is registered for each different IMPI-IMPU pair.

Embodiment 71

A method performed by an Internet Protocol Multimedia Subsystem, IMS, node relating to initiating a session for a wireless device (410) using an IMS network slice (412), the method comprising: receiving a message comprising an identifier mapped to one or more network slice identifiers of one or more IMS network slices (412), respectively, wherein the one or more IMS network slices (412) comprise a desired IMS network slice (412) on which a wireless device (410) is initiating a session.

Embodiment 72

The method of embodiment 71 wherein the identifier is mapped to two or more network slice identifiers of two or more IMS network slices (412), respectively.

Embodiment 73

A method performed by a Home Subscriber Service, HSS, (420) relating to registering a wireless device (410) with an Internet Protocol Multimedia Subsystem, IMS, network slice (412), the method comprising: receiving (504), from an IMS node (418), a query comprising a flag related to IMS network slicing; and sending (506), to the IMS node (418), a response comprising a list of Serving Call Session Control Functions, S-CSCFs, (414) and one or more identifiers of one or more IMS network slices (412) for each S-CSCF (414) in the list of S-CSCFs (414).

Embodiment 74

A method performed by a Home Subscriber Service, HSS, (420) relating to initiating a session for a wireless device (410) using an Internet Protocol Multimedia Subsystem, IMS, network slice (412), the method comprising: receiving (710), from an IMS node (418), a query comprising an identifier mapped to one or more network slice identifiers of one or more IMS network slices (412), respectively, wherein the one or more IMS network slices (412) comprise a desired IMS network slice (412) on which a wireless device (410) is initiating a session; locating (712) a Serving Call Session Control Function, S-CSCF, (414) with which the wireless device (410) is registered that corresponds to the one or more IMS network slices (412); and sending (714), to the IMS node (418), a response comprising an identifier of the S-CSCF (414).

Embodiment 75

An Internet Protocol Multimedia Subsystem, IMS, node for registering a wireless device (410) with an IMS network slice (412) or initiating a session for the wireless device (410) using an IMS network slice (412), the IMS node adapted to perform the method of any one of embodiments 23 to 74.

Embodiment 76

An Internet Protocol Multimedia Subsystem, IMS, physical infrastructure node (800) on which an IMS node is operating for registering a wireless device (410) with an IMS network slice (412) or initiating a session for the wireless device (410) using an IMS network slice (412), the IMS node adapted to perform the method of any one of embodiments 23 to 74.

Embodiment 77

An Internet Protocol Multimedia Subsystem, IMS, physical infrastructure node (800) comprising: one or more network interfaces (806); one or more processors (802); and memory (804) comprising instructions executable by the one or more processors (802) whereby the IMS physical infrastructure node (800) is operable to host a virtual IMS node operable to perform the method of any one of embodiments 23 to 74.

Embodiment 78

An Internet Protocol Multimedia Subsystem, IMS, physical infrastructure node (800) comprising: one or more modules (900) operable to provide a virtual IMS node operable to perform the method of any one of embodiments 23 to 74.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core Network
5GS Fifth Generation System
AMF Authentication Management Function
API Application Program Interface
ASIC Application Specific Integrated Circuit
CPU Central Processing Unit
DSP Digital Signal Processor
eMBB Enhanced Mobile Broadband
eNB Enhanced or Evolved Node B
EPC Evolved Packet Core
FPGA Field Programmable Gate Array
FQDN Fully Qualified Domain Name
gNB New Radio Base Station
HSS Home Subscriber Service
I-CSCF Interrogating Call Session Control Function
ID Identifier
IE Information Element
IMPI Internet Protocol Multimedia Private Identity
IMPU Internet Protocol Multimedia Public Identity
IMS Internet Protocol Multimedia Subsystem
IoT Internet of Things
IP Internet Protocol
LBO Local Breakout
MTC Machine Type Communication
mMTC Massive Machine Type Communication
NFV Network Functions Virtualization
NNI Network-to-Network Interface
NR New Radio
NS-ID Network Slice Identifier
PCF Policy Control Function
PCRF Policy and Charging Rules Function
P-CSCF Proxy Call Session Control Function
PDN Packet Data Network
RAM Random Access Memory
RAN Radio Access Network
ROM Read Only Memory
SC-ID Service Classifier Identifier
S-CSCF Serving Call Session Control Function
SD Slice Differentiator
SDN Software Defined Networking
SIP Session Initiation Protocol
S-NSSAI Single Network Slice Selection Assistance Information
SST Slice/Service Type
UE User Equipment
UPF User Plane Function
URLLC Ultra Reliable Low Latency Communication
VoLTE Voice Over Long Term Evolution Those skilled in the art will recognize improvements and modifications to the embodiments of the present disclosure. All such improvements and modifications are considered within the scope of the concepts disclosed herein.

What is claimed is:

1. A method performed by a wireless device relating to registering with an Internet Protocol Multimedia Subsystem, IMS, network slice or initiating a session using a IMS network slice, the method comprising:
selecting a Proxy Call Session Control Function, P-CSCF, from two or more P-CSCFs based on an identifier of a desired IMS network slice; and
sending a message to an IMS node via a radio access network, the message comprising the identifier of the desired IMS network slice, wherein sending the message comprises sending the message to the selected P-CSCF;
wherein selecting the P-CSCF from the two or more P-CSCFs based on the identifier of the desired IMS network slice comprises:
obtaining two or more Fully Qualified Domain Names, FQDNs, or two or more Internet Protocol, IP, addresses for the two or more P-CSCFs, respectively;
obtaining information that indicates one or more supported IMS network slices for each P-CSCF of the two or more P-CSCFs; and
selecting, based on the information that indicates one or more supported IMS network slices for each P-CSCF of the two or more P-CSCFs, one of the two or more P-CSCFs that supports the desired IMS network slice as the selected P-CSCF to which to send the message.

2. The method of claim 1 wherein the message is a first registration message for registration of the wireless device with the desired IMS network slice.

3. The method of claim 2 wherein the message comprises an Internet Protocol Multimedia Private Identity, IMPI, of the wireless device.

4. The method of claim 3 wherein the message further comprises an Internet Protocol Multimedia Public Identity, IMPU, of the wireless device.

5. The method of claim 3 wherein the message further comprises information that indicates a plurality of Internet Protocol Multimedia Public Identities, IMPUs, of the wireless device.

6. The method of claim 2 further comprising sending a second registration message to an IMS node via the radio access network, the second registration message comprising an identifier of a second desired IMS network slice.

7. The method of claim 6 wherein the first registration message and the second registration message are for a same IMPI-IMPU pair of the wireless device.

8. The method of claim 6 wherein the first registration message and the second registration message are for a same IMPI of the wireless device but different IMPUs of the wireless device.

9. The method of claim 6 wherein the first registration message and the second registration message are for different IMPIs of the wireless device and different IMPUs of the wireless device.

10. The method of claim 2 further comprising receiving a response from the IMS node comprising a list of identifiers of IMS network slices to which the wireless device is subscribed.

11. The method of claim 1 wherein the message is a Session Initiation Protocol, SIP, INVITE.

12. The method of claim 1 wherein the identifier of the desired IMS network slice is mapped to one or more Fifth Generation System, 5GS, network slices.

13. A wireless device for registering with an Internet Protocol Multimedia Subsystem, IMS, network slice or initiating a session using an IMS network slice, the wireless device comprising:
  one or more transmitters and one or more receivers operable to provide wireless transmission and reception using a radio access network;
  one or more processors; and
  memory comprising instructions executable by the one or more processors whereby the wireless device is operable to:
    select a Proxy Call Session Control Function, P-CSCF, from two or more P-CSCFs based on an identifier of a desired IMS network slice; and
  send a message to an IMS node via a radio access network, the message comprising the identifier of the desired IMS network slice, wherein the wireless device is operable to send the message by being operable to send the message to the selected P-CSCF;
    wherein selecting the P-CSCF from the two or more P-CSCFs based on the identifier of the desired IMS network slice comprises being operable to:
      obtain two or more Fully Qualified Domain Names, FQDNs, or two or more Internet Protocol, IP, addresses for the two or more P-CSCFs, respectively;
      obtain information that indicates one or more supported IMS network slices for each P-CSCF of the two or more P-CSCFs; and
      select, based on the information that indicates one or more supported IMS network slices for each P-CSCF of the two or more P-CSCFs, one of the two or more P-CSCFs that supports the desired IMS network slice as the selected P-CSCF to which to send the message.

\* \* \* \* \*